US011731086B2

(12) United States Patent
Choi et al.

(10) Patent No.: US 11,731,086 B2
(45) Date of Patent: Aug. 22, 2023

(54) GAS SEPARATION MEMBRANE CONTAINING HETEROGENEOUS ZEOLITES AND PREPARATION METHOD THEREOF

(71) Applicant: Korea University Research and Business Foundation, Seoul (KR)

(72) Inventors: Jungkyu Choi, Seoul (KR); Yanghwan Jeong, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 134 days.

(21) Appl. No.: 17/326,649

(22) Filed: May 21, 2021

(65) Prior Publication Data

US 2021/0362099 A1    Nov. 25, 2021

(30) Foreign Application Priority Data

May 21, 2020 (KR) .................. 10-2020-0061225
Apr. 26, 2021 (KR) .................. 10-2021-0053818

(51) Int. Cl.
*B01D 71/02* (2006.01)

(52) U.S. Cl.
CPC ...... *B01D 71/028* (2013.01); *B01D 2257/504* (2013.01); *B01D 2323/40* (2013.01)

(58) Field of Classification Search
None
See application file for complete search history.

(56) References Cited

U.S. PATENT DOCUMENTS

| 6,037,292 A * | 3/2000 | Lai ................ B01D 71/028 502/4 |
| 2012/0148828 A1* | 6/2012 | Tsapatsis ............ B01D 71/028 423/709 |

FOREIGN PATENT DOCUMENTS

| JP | 4277731 B2 | 6/2009 |
| KR | 10-0861012 B1 | 10/2008 |
| KR | 10-1927889 B1 | 12/2018 |
| KR | 10-2019-0030645 A | 3/2019 |

OTHER PUBLICATIONS

Jang, Eunhee et al., "An unprecedented c-oriented DDR@MWW zeolite hybrid membrane: new insights into H2-permselectivities via six membered-ring pores", Journal of Materials Chemistry A, 8, Jul. 2020, pp. 14071-14081. (Year: 2020).*

(Continued)

*Primary Examiner* — Jason M Greene
(74) *Attorney, Agent, or Firm* — NSIP Law

(57) ABSTRACT

Disclosed are a MWW/DDR type gas separation membrane comprising at least one MWW type zeolite and at least one DDR type zeolite and a method for preparing the same. One of the MWW type zeolite and the DDR type zeolite is disposed on the other thereof, wherein at least one of the MWW type zeolite and the DDR type zeolite is epitaxially grown. In the gas separation membrane, the DDR type zeolite is epitaxially grown from the MWW type zeolite, or the MWW type zeolite is epitaxially grown from the DDR type zeolite. Thus, the MWW/DDR type gas separation membrane is synthesized using a structural continuity of the MWW type zeolite and the DDR type zeolite. Thus, the gas separation membrane has excellent separation efficiency.

16 Claims, 18 Drawing Sheets

(56) References Cited

OTHER PUBLICATIONS

Electronic Supplementary Information for the publication "An Unprecedented c-Oriented DDR@MWW Zeolite Hybrid Membrane: New Insights into H2-Permselectivities via Six Membered-Ring Pores", 2020, 35 Pages. (Year: 2020).*

Jeong, Yanghwan et al., "An Hetero-Epitaxially Grown Zeolite Membrane", Angewandte Chemie, 58, 2019, pp. 18654-18662. (Year: 2019).*

Supporting Information for the publication "An Hetero-Epitaxially Grown Zeolite Membrane", 30 pages, 2019. (Year: 2019).*

Hu, Enping et al., "Synthesis of highly oriented AFI membranes by epitaxial growth", Microporous and Mesoporous Materials, 126, 2009, pp. 81-86. (Year: 2009).*

Jeong, Yanghwan, et al. "A Hetero-Epitaxially Grown Zeolite Film and its Unprecedented Use as a Perm-selective Membrane" Angewandte Chemie 131.51 (2019): (51 pages in English).

Korean Office Action dated Jul. 14, 2022, in counterpart Korean Patent Application No. 10-2021-0053818 (7 pages in Korean).

* cited by examiner

GAS SEPARATION MEMBRANE CONTAINING HETEROGENEOUS ZEOLITES AND PREPARATION METHOD THEREOF

CROSS-REFERENCE TO RELATED APPLICATION

This application claims a benefit under 35 U.S.C. § 119(a) of Korean Patent Application No. 10-2020-0061225 filed on May 21, 2020 and Korean Patent Application No. 10-2021-0053818 filed on Apr. 26, 2021, on the Korean Intellectual Property Office, the entire disclosure of which is incorporated herein by reference for all purposes.

BACKGROUND

1. Field

The present disclosure relates to a gas separation membrane including MWW type zeolite and DDR type zeolite and a method for preparing the same. More specifically, the present disclosure relates to a gas separation membrane including MWW type zeolite or DDR type zeolite epitaxially-grown on the other type zeolite, and a method for preparing the same.

2. Description of Related Art

Zeolite acts as a catalyst for conversion of methanol to gasoline or as a support for NOx conversion, and acts as a molecular sieve made of alumina-silica having a regular three-dimensional framework structure in which tetrahedrons of $SiO_4$ and $AlO_4^-$ are geometrically coupled to each other. The tetrahedrons are coupled to each other while sharing oxygen, and the framework has channels and has cavities connected to each other. Zeolite has excellent ion exchange properties, and thus is used for various purposes such as catalysts, adsorbents, molecular sieves, ion exchange agents, and gas separation membranes.

In a conventional zeolite-based gas separation membrane, separation performance is greatly reduced due to defects larger than a pore size inherently belonging to zeolite. The defects are inevitably generated when manufacturing the gas separation membrane, which makes it difficult to manufacture a high-performance gas separation membrane.

Therefore, development of a gas separation membrane with excellent separation performance by filling the defect larger than the pore size of the zeolite is required.

In this connection, a prior literature includes Korean Patent No. 10-0861012.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a gas separation membrane in which heterogeneous zeolites are epitaxially grown alternately with each other and one on top of the other and a method for preparing the same. Specifically, the present disclosure provides a gas separation membrane in which DDR type zeolite is epitaxially grown from MWW type zeolite, or MWW type zeolite is epitaxially grown from DDR type zeolite.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

The present disclosure provides a MWW/DDR type gas separation membrane comprising at least one MWW type zeolite and at least one DDR type zeolite, wherein one of the MWW type zeolite and the DDR type zeolite is disposed on the other thereof, wherein at least one of the MWW type zeolite and the DDR type zeolite is epitaxially grown.

Further, the present disclosure provides a method for preparing a gas separation membrane, the method comprising: a first zeolite formation step of forming first zeolite, wherein the first zeolite formation step includes: providing a first zeolite precursor solution contains a first structure directing agent and a first raw material; performing first hydrothermal synthesis on the first zeolite precursor solution to form first zeolite in a form of a plurality of first zeolite particles; and depositing the plurality of first zeolite particles on a support; a second zeolite formation step of forming second zeolite, wherein the second zeolite formation step includes: providing a second zeolite precursor solution, wherein the second zeolite precursor solution contains a second structure directing agent and a second raw material; applying the second zeolite precursor solution on the plurality of first zeolite particles; and performing second hydrothermal synthesis on the second zeolite precursor solution to form the second zeolite on the plurality of first zeolite particles, wherein each of the first and second raw materials includes at least one of Si or Al, wherein the second zeolite is epitaxially grown on the first zeolite.

The gas separation membrane according to the present disclosure may have a structural continuity of the MWW type zeolite and the DDR type zeolite such that the heterogeneous zeolites are epitaxially grown one on top of the other, thereby achieving have excellent separation efficiency.

In addition to the effects as described above, specific effects according to the present disclosure will be described together with the detailed description for carrying out the disclosure.

DETAILED DESCRIPTIONS

Figure 1:
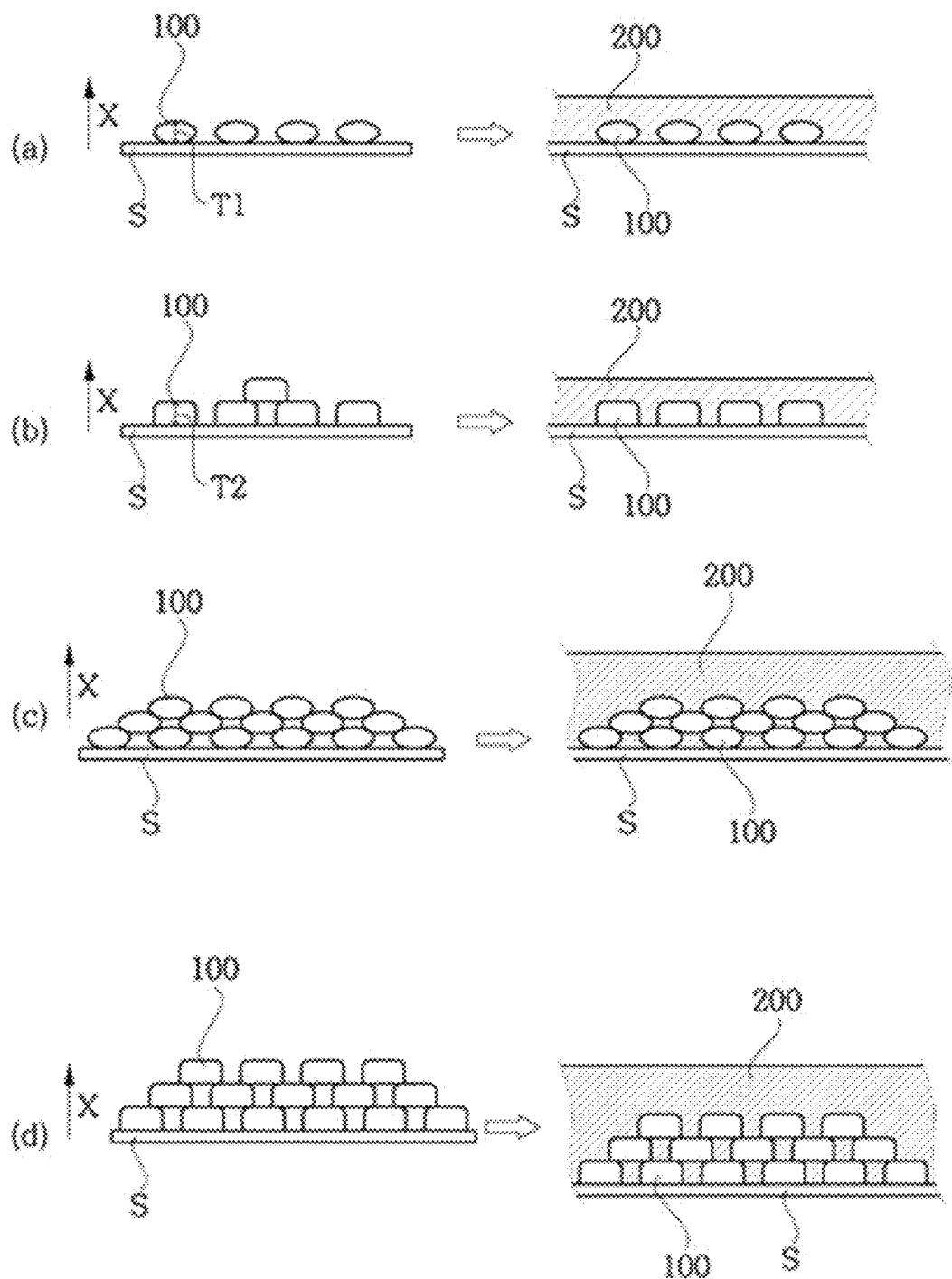
FIG. 1 is a schematic diagram showing a cross-sectional view of a gas separation membrane according to one embodiment of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope according to the present disclosure as defined by the appended claims.

Further, descriptions and details of well-known steps and elements are omitted for simplicity of the description. Furthermore, in the following detailed description of the present disclosure, numerous specific details are set forth in order to provide a thorough understanding according to the present disclosure. However, it will be understood that the present disclosure may be practiced without these specific details. In other instances, well-known methods, procedures, components, and circuits have not been described in detail so as not to unnecessarily obscure aspects according to the present disclosure.

The terminology used herein is for the purpose of describing particular embodiments only and is not intended to be limiting according to the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A zeolite-based gas separation membrane may serve as a molecular sieve because micropore sizes thereof are constant. When the zeolite-based gas separation membrane is applied to a separation process, it is expected that energy used in an existing separation process may be reduced. To date, 253 types of zeolite structures have been approved. Nevertheless, a few zeolite (e.g., MFI, FAU, CHA, DDR, MOR, LTA) structures are employed as a gas separation membrane.

When synthesizing the gas separation membrane, a method in which a uniform seed layer is formed and then a gas separation membrane is prepared via secondary growth is mainly used. In most cases, the seed layer and the gas separation membrane grown via the secondary growth have the same structure.

DDR type zeolite has a pore size of about 0.36×0.44 nm$^2$ and may act as a molecular sieve which may selectively separate $CO_2$ (0.33 nm). However, regarding the DDR type zeolite, it may be difficult to synthesize seed particles. Reproducibility there may be low. Thus, it may be difficult to form a seed layer of a gas separation membrane. Thus, it may be difficult to synthesize a continuous DDR type zeolite-based gas separation membrane.

Further, MWW type zeolite may be embodied as plate-shaped particles. When the plate-shaped particles are positioned with a c-orientation in the out-of-plane direction, a separation target substance should vertically pass through 6-membered ring (MR) pores (0.28 nm). Thus, the MWW type zeolite is employed as a hydrogen-selective gas separation membrane. However, it is difficult to form a gas separation membrane having an orientation of the MWW type zeolite along the 6 MR pores. Thus, there is no report of a continuous gas separation membrane based on the MWW type zeolite.

The present disclosure provides a MWW/DDR type gas separation membrane comprising at least one MWW type zeolite and at least one DDR type zeolite, wherein one of the MWW type zeolite and the DDR type zeolite is disposed on the other thereof, wherein at least one of the MWW type zeolite and the DDR type zeolite is epitaxially grown.

In the MWW/DDR structure, the MWW type zeolite and the DDR type zeolite are epitaxially grown from each other. This means that at least one DDR type zeolite is epitaxially grown on at least one MWW type zeolite, or that at least one MWW type zeolite is epitaxially grown on at least one DDR type zeolite.

In one example, in the gas separation membrane of the present disclosure, each of the MWW type zeolite and DDR type zeolite may constitute an individual layer. A layer of the MWW type zeolite and a layer of the DDR type zeolite may be vertically and repeatedly stacked alternately with each other. A thickness of the gas separation membrane may be in a range of 0.1 to 50 μm, 0.1 to 30 μm, 0.5 to 10 μm or 0.5 to 3 μm.

In one example, the DDR type zeolite may be epitaxially grown on the MWW type zeolite using hydrothermal synthesis under a first condition. Alternatively, the MWW type zeolite may be epitaxially grown on the DDR type zeolite using hydrothermal synthesis under a second condition.

Under the first condition, the hydrothermal synthesis may be carried out at 100° C. to 200° C., 100° C. to 180° C., 120° C. to 160° C. or 130° C. to 160° C. for 0.5 days to 15 days, 1 day to 15 days or 1 day to 10 days. Under the second condition, the hydrothermal synthesis may be carried out at 100° C. to 200° C., 100° C. to 180° C., 120° C. to 160° C. or 130° C. to 150° C. for 0.5 days to 15 days, 1 day to 15 days or 1 day to 11 days.

The MWW type zeolite may have a molar ratio reference value of Si:Al of 100:0 to 10 or 100:1 to 10.

The DDR type zeolite may have a molar ratio reference value of Si:Al of 100:0 to 10 or 100:0 to 1.

The gas separation membrane according to the present disclosure has a structure in which the heterogeneous zeolites, that is, the MWW type zeolite and the DDR type zeolite are disposed one on top of the other, and the MWW type zeolite and the DDR type zeolite are epitaxially intergrown from each other. Thus, the gas separation membrane according to the present disclosure may have further improved gas separation efficiency of separating carbon dioxide gas ($CO_2$) from a gas mixture, compared to the conventional gas separation membrane.

FIG. 1 is a schematic diagram showing a cross-sectional view of a gas separation membrane according to one embodiment of the present disclosure.

As shown in (a) in FIG. 1, in the gas separation membrane of the present disclosure, when the DDR type zeolite is disposed on the MWW type zeolite, the MWW type zeolite is composed of a group of a plurality of MWW type zeolite particles, wherein each of the MWW type zeolite particles has an average vertical dimension T1 in a range of 10 nm to 1 μm, 100 nm to 1 μm, 10 nm to 800 nm, 20 nm to 500 nm, 10 nm to 100 nm or 50 nm to 100 nm.

Alternatively, when the MWW type zeolite is disposed on the DDR type zeolite as shown in (b) of FIG. 1, the DDR type zeolite may be composed of a plurality of DDR type zeolite particles. In this connection, each of the DDR type zeolite particles may have an average vertical dimension T2 in the first direction in a range of 0.1 μm to 10 μm, 0.1 μm to 5 μm, 0.5 μm to 5 μm, 1 μm to 5 μm, 0.5 μm to 3 μm or 0.1 μm to 1 μm.

In addition, as shown in (c) of FIG. 1, the plurality of MWW type zeolite particles are stacked in a multi-layered manner to form first zeolite. Further, as shown in (d) of FIG. 1, the plurality of DDR type zeolite particles are stacked in a multi-layered manner to form second zeolite.

Each of the MWW type zeolite and DDR type zeolite (the first zeolite) particles may serve as a seed for forming the second zeolite.

Figure 2:
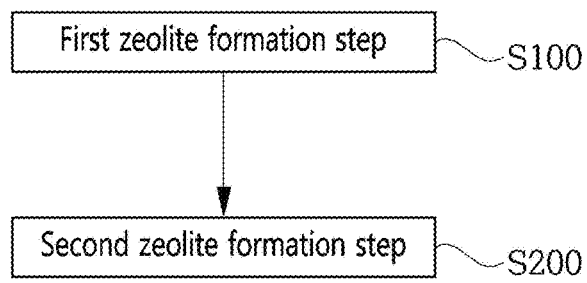
FIG. 2 is a flowchart showing a method for preparing a gas separation membrane according to one embodiment of the present disclosure.
Figure 3:
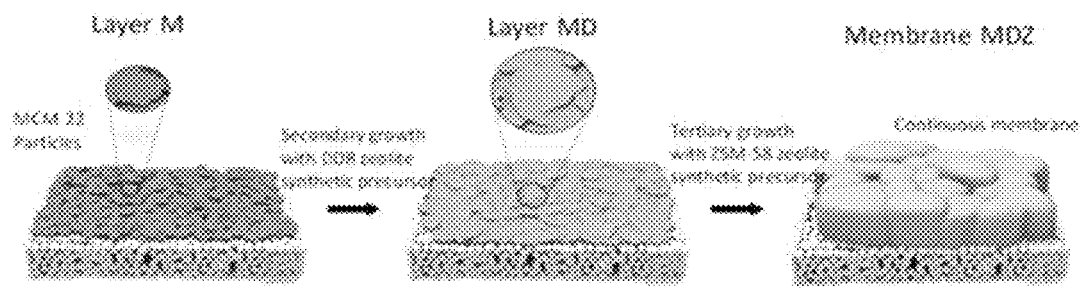
FIG. 3 is a schematic diagram showing a method for preparing a gas separation membrane according to one embodiment of the present disclosure.

FIG. 2 is a flowchart showing a method for preparing a gas separation membrane according to one embodiment of the present disclosure. FIG. 3 is a schematic diagram showing a method for preparing a gas separation membrane according to another embodiment of the present disclosure.

As shown in FIG. 2, the present disclosure provides a method for preparing a gas separation membrane, the method comprising:

the method comprising: a first zeolite formation step of forming first zeolite, wherein the first zeolite formation step includes: providing a first zeolite precursor solution contains a first structure directing agent and a first raw material; performing first hydrothermal synthesis on the first zeolite precursor solution to form first zeolite in a form of a plurality of first zeolite particles; and depositing the plurality of first zeolite particles on a support; a second zeolite formation step of forming second zeolite, wherein the second zeolite formation step includes: providing a second zeolite precursor solution, wherein the second zeolite precursor solution contains a second structure directing agent and a second raw material; applying the second zeolite precursor solution on the plurality of first zeolite particles; and performing second hydrothermal synthesis on the second zeolite precursor solution to form the second zeolite on the plurality of first zeolite particles, wherein each of the first and second raw materials includes at least one of Si or Al, wherein the second zeolite is epitaxially grown on the first zeolite.

As shown in FIG. 3, the method for preparing a gas separation membrane according to the present disclosure may further include, between the first zeolite formation step and the second zeolite formation step, a buffer formation step of forming a buffer, wherein the buffer covers at least a portion of each of the plurality of first zeolite particles.

The buffer formation step may grow buffer zeolite on the plurality of particles of the first zeolite by applying a buffer precursor solution on the first zeolite and performing hydrothermal synthesis on the buffer precursor solution.

In one example, the buffer formation step may be omitted. Structural stability of the separation membrane may be further improved by the buffer formation step to allow an interface between the first and second zeolites having the different structures to grow epitaxially.

Each of the first and second raw materials may include at least one of Si and Al.

The raw material including Si may include at least one of silica ($SiO_2$), monomeric silica, fumed silica, and colloidal silica.

The raw material including Al may include aluminum oxide salt. Specifically, the raw material including Al may be $NaAl_2O_3$.

Specifically, when one of the first and second zeolite precursor solutions is a solution for growing the MWW type zeolite, one of the first and second raw material includes Si and Al. In one of the first and second zeolite precursor solutions, a ratio of molar concentrations of Si:Al:the structure directing agent:solvent may be in a range of 100:0 to 10:10 to 500:500 to 20000 or may be in a range of 100:1 to 10:10 to 500:500 to 20000.

Further, when one of the first and second zeolite precursor solutions is a solution for growing the DDR type zeolite, one of the first and second raw materials includes Si and Al. In one of the first and second zeolite precursor solutions, a ratio of molar concentrations of Si:Al:the structure directing agent:solvent may be in a range of 100:0 to 10:1 to 200:500 to 20000 or may be in a range of 100:0 to 1:1 to 200:500 to 20000.

In one embodiment, the particle of the first zeolite has an average vertical dimension in a range of 10 nm to 1 μm, wherein a ratio of molar concentrations of Si, Al, the first structure directing agent, and a solvent in the first zeolite precursor solution is in a range of 100:0 to 10:10 to 500:500 to 20000, wherein a ratio of molar concentrations of Si, Al, the second structure directing agent, and a solvent in the second zeolite precursor solution is in a range of 100:0 to 10:1 to 200:500 to 20000.

In one embodiment, the particle of the first zeolite has an average vertical dimension in a range of 0.1 μM to 10 μM, wherein a ratio of molar concentrations of Si, Al, the first structure directing agent, and a solvent in the first zeolite precursor solution is in a range of 100:0 to 10:1 to 200:500 to 20000, wherein a ratio of molar concentrations of Si, Al, the second structure directing agent, and a solvent in the second zeolite precursor solution is in a range of 100:0 to 10:10 to 500:500 to 20000.

The solvent may include distilled water, deionized water or ethanol.

In one embodiment, each of the first and second structure directing agents individually includes at least one selected from a group consisting of hexamethyleneimine (HMI), piperidine, 1-adamantylamine, ethylenediamine, methyltropinium salt, 1-TMAdaOH (N,N,N-trimethyl-1-adamantylammonium hydroxide), TMAdaBr (N,N,N-trimethyl-1-adamantylammonium bromide), TMAdaF (N,N,N-trimethyl-1-adamantylammonium fluoride), TMAdaCl (N,N,N-trimethyl-1-adamantylammonium chloride), TMAdaI (N,N,N-trimethyl-1-adamantylammonium iodide), TEAOH (tetraethylammonium hydroxide), TEABr (tetraethylammonium bromide), TEAF (tetraethylammonium fluoride), TEACl (tetraethylammonium chloride), TEAI (tetraethylammonium iodide), dipropylamine, and cyclohexylamine.

The methyltropinium salt may include at least one selected from a group consisting of methyltropinium iodide, methyltropinium fluoride, methyltropinium chloride, methyltropinium bromide, and methyltropinium hydroxide.

Specifically, the structure directing agent for growing the MWW type zeolite among the first and second structure directing agents may include at least one selected from a group consisting of hexamethyleneimine (HMI), piperidine, TMAdaOH (N,N,N-trimethyl-1-adamantylammonium hydroxide), TMAdaBr (N,N,N-trimethyl-1-adamantylammonium bromide), TMAdaF (N,N,N-trimethyl-1-adamantylammonium fluoride), TMAdaCl (N,N,N-trimethyl-1-adamantylammonium chloride), and TMAdaI (N,N,N-trimethyl-1-adamantylammonium iodide).

Further, the structure directing agent for growing the DDR type zeolite among the first and second structure directing agents may include at least one selected from a group consisting of methyltropinium salt, 1-adamantylamine, and ethylenediamine.

The support may include at least one selected from a group consisting of α-alumina, γ-alumina, polypropylene, polyethylene, polytetrafluoroethylene, polysulfone, polyimide, silica, glass, mullite, zirconia, titania, yttria, ceria, vanadia, silicon, stainless steel, carbon, calcium oxide, and phosphorus oxide.

The first zeolite formation step includes: providing a first zeolite precursor solution contains a first structure directing agent and a first raw material; performing first hydrothermal synthesis on the first zeolite precursor solution to form first zeolite in a form of a plurality of first zeolite particles; and depositing the plurality of first zeolite particles on a support.

The first zeolite formation step may mainly have following two steps:

(1) A first zeolite particles formation step of forming a plurality of first zeolite particles by performing hydrothermal synthesis on the first zeolite precursor solution under the first condition or second condition; and (2) A first zeolite deposition step to deposit the first zeolite particles on the support using a suspension containing the formed plurality of first zeolite particles dispersed therein.

When the first zeolite precursor solution is a solution for forming MWW type zeolite particles, the first raw material includes Si and Al, and the ratio of molar concentrations of Si:Al:structure directing agent:solvent in the first zeolite precursor solution may be in a range of 100:0 to 10:10 to 500:500 to 20000 or may be in a range of 100:1 to 10:10 to 500:500 to 20000. Specifically, the first zeolite precursor solution for forming MWW type zeolite particles may be a mixed solution of Si, Na, Al and the structure directing agent, wherein the ratio of molar concentrations of Si:Na:Al:structure directing agent:solvent may be in a range of 100:10 to 100:0 to 10:10 to 500:500 to 20000 or may be in a range of 100:10 to 100:1 to 10:10 to 500:500 to 20000.

Further, when the first zeolite precursor solution is a solution for forming DDR type zeolite particles, the first raw material includes Si and Al, and may be a mixed solution of Si, Al, structure directing agent, and solvent, wherein the ratio of molar concentrations of Si:Al:structure directing agent:solvent may be in a range of 100:0 to 10:1 to 200:500 to 20000 or may be in a range of 100:0 to 1:1 to 200:500 to 20000. Specifically, the first zeolite precursor solution for forming DDR type zeolite particles may be a mixed solution of $SiO_2$, Na, Al, the structure directing agent, and solvent, wherein the ratio of molar concentrations of $SiO_2$:Na:Al:structure directing agent:solvent may be in a range of 100:10 to 100:0 to 10:1 to 200:500 to 20000 or may be in a range of 100:10 to 100:0 to 1:1 to 200:500 to 20000.

The first condition is a condition for forming DDR type zeolite particle. Under the first condition, the hydrothermal synthesis may be carried out for 0.5 days to 15 days, 1 day to 15 days or 1 to 10 days at 100° C. to 200° C., 100° C. to 180° C., 120° C. to 160° C. or 130° C. to 160° C. The second condition is a condition to form particles of MWW type zeolite. Under the second condition, the hydrothermal synthesis may be carried at a temperature of 100° C. to 200° C., 100° C. to 180° C., 120° C. to 160° C. or 130° C. to 150° C. for 0.5 days to 15 days, 1 day to 15 days or 1 to 11 days.

The first zeolite particles formation step may further include, after the first hydrothermal synthesis, the calcination step for heating the first zeolite particles at a temperature of 450 to 550° C. at a ramp rate of 0.5 to 1.5° C./min for 12 to 40 hours.

Further, in the first zeolite deposition step, the prepared plurality of first zeolite particles may be mixed with a solvent including any one or more of anhydrous toluene, ethanol and distilled water to produce a suspension, and then the plurality of first zeolite particles may be deposited on the substrate using the suspension to form a layer thereof thereon.

When the first zeolite is formed under the condition described above, the average vertical dimension T1 of the first zeolite particle 100 on the support S as shown in (a) in FIG. 1 may be in a range of 10 nm to 1 μm, 100 nm to 1 μm, 10 nm to 800 nm, 20 nm to 500 nm, 10 nm to 100 nm or 50 nm to 100 nm. In this connection, the first zeolite particles 100 may be MWW type zeolite particles. Further, as shown in (c) of FIG. 1, a plurality of layers of the plurality of first zeolite particles 100 may be stacked on the support S to form the first zeolite.

Alternatively, as shown in (b) of FIG. 1, the average vertical dimension T2 of the first zeolite particle 100 on the support S may be in a range of 0.1 μm to 10 μm, 0.1 μm to 5 μm, 0.5 μm to 5 μm, 1 μm to 5 μm, 0.5 μm to 3 μm or 0.1 μm to 1 μm. In this connection, the first zeolite particles 100 may be DDR type zeolite particles. Further, as shown in (d) of FIG. 1, a plurality of layers of the plurality of first zeolite particles 100 may be stacked on the support S to form the first zeolite.

The first zeolite particles may serve as a seed to form the second zeolite.

A thickness of the first zeolite may be in a range of 0.1 to 10 μm, 0.5 to 10 μm, 0.1 to 1 μm or 1 to 10 μm. When the first zeolite is MWW type zeolite, the thickness of the first zeolite may be in a range of 0.1 to 1 μm. Alternatively, when the first zeolite When is DDR type zeolite, the thickness of the first zeolite may be in a range of 1 to 10 on.

When forming the first zeolite having the thickness in the above defined range, the second zeolite may be grown to form a continuous crystal phase with the first zeolite particles.

The first zeolite deposition step may further include, after the deposition, the calcination step for heating the first zeolite particles at 400 to 500° C. at a ramp rate of 0.2 to 1.0° C./min for 12 to 40 hours.

The calcination as described above may increase the binding force of the first zeolite with the porous support, and thus a stable first zeolite may be formed.

In the buffer formation step, the buffer zeolite is epitaxially grown to form a continuous crystal phase with a plurality of first zeolite particles of the first zeolite. Thus, the buffer zeolite formed in the buffer formation step serves as a precursor to grow the second zeolite in a 3 dimensional manner.

The first and second zeolites are made of different types of zeolite. The buffer zeolite structure formed in the buffer precursor solution may be the same as the second zeolite structure.

Specifically, the buffer formation step includes: providing a buffer precursor solution containing 1-adamantylamine, ethylenediamine, fumed silica, and a solvent, wherein a ratio of molar concentrations of 1-adamantylamine, ethylenediamine, fumed silica, and the solvent in the buffer precursor solution is in a range of 1 to 20:100 to 200:100:1000 to 20000; applying the buffer precursor solution on the first zeolite; and performing third hydrothermal synthesis on the buffer precursor solution to form the buffer on the first zeolite. In this connection, the third hydrothermal synthesis may be carried out at a temperature of 100° C. to 200° C., 100° C. to 180° C., 120° C. to 160° C. or 130° C. to 160° C. for 1 day to 5 days or 1 day to 3 days.

In the buffer formation step, the buffer may be formed via the third hydrothermal synthesis under the condition as described above, such that the second zeolite particles may be epitaxially grown from the first zeolite particles in a more reliable manner.

The buffer formation step may further include, after the third hydrothermal synthesis, a calcination step for heating the buffer at a temperature of 450 to 550° C. at a ramp rate of 0.2 to 0.5° C./min for 12 to 40 hours.

The buffer zeolite particles prepared via the calcination process as described above may be thermally activated, and the buffer zeolite particles may have a strong binding force with the first zeolite.

The second zeolite formation step of forming second zeolite includes providing a second zeolite precursor solution, wherein the second zeolite precursor solution contains a second structure directing agent and a second raw material; applying the second zeolite precursor solution on the plurality of first zeolite particles; and performing second hydrothermal synthesis on the second zeolite precursor solution to form the second zeolite on the plurality of first zeolite particles.

When the second zeolite precursor solution is a solution for forming MWW type zeolite, the second raw material includes Si and Al, and may be a mixed solution of Si, Al, structure directing agent, and the solvent, wherein the ratio of molar concentrations of Si:Al: structure directing agent: solvent in the second zeolite precursor solution may be in a range of 100:0 to 10:10 to 500:500 to 20000 or may be in a range of 100:1 to 10:10 to 500:500 to 20000. Specifically, the second zeolite precursor solution for forming MWW type zeolite may contain Si, Na, Al, and the structure directing agent, and the solvent, wherein the ratio of molar concentrations of Si:Na:Al:structure directing agent:solvent may be in a range of 100:10 to 100:0 to 10:10 to 500:500 to 20000 or may be in a range of 100:10 to 100:1 to 10:10 to 500:500 to 20000.

Further, when the second zeolite precursor solution is a solution for forming DDR type zeolite, the second raw material includes Si and Al, and the solution may be a mixed solution of Si, Al, structure directing agent, and the solvent, wherein the ratio of molar concentrations of Si:Al:structure directing agent:solvent in the second zeolite precursor solution may be in a range of 100:0 to 10:1 to 200:500 to 20000 or may be in a range of 100:0 to 1:1 to 200:500 to 20000. Specifically, the second zeolite precursor solution for forming DDR type zeolite may contain Si, Na, Al, the structure directing agent, and the solvent, wherein the ratio of molar concentrations of Si:Na:Al:structure directing agent:solvent may be in a range of 100:10 to 100:0 to 10:1 to 200:500 to 20000 or may be in a range of 100:10 to 100:0 to 1:1 to 200:500 to 20000.

In the second zeolite precursor solution, the structure directing agent may be the methyltropinium salt. When using the second zeolite precursor solution containing the methyltropinium salt, the second zeolite may be grown to have a continuous out-of-plane orientation with the first zeolite using hydrothermal synthesis as described above.

Specifically, as shown in FIG. 1, as the second zeolite is grown from the plurality of first zeolite particles 100 formed on the support S, one plane is formed to form the second zeolite layer 200. As shown in (a) of FIG. 1, when the plurality of first zeolite particles 100 are MWW type zeolite particles, the second zeolite layer 200 may be made of DDR type zeolite. As shown in (c) of FIG. 1, the second zeolite layer 200 may be formed on a stack of the layers of the plurality of first zeolite particles 100.

Alternatively, when the plurality of first zeolite particles 100 are DDR type zeolite particles as shown in (b) of FIG.

1, the second zeolite layer 200 may be made of MWW type zeolite. As shown in (d) of FIG. 1, the second zeolite layer 200 may be formed on a stack of the layers of the plurality of first zeolite particles 100.

Under the first condition, the hydrothermal synthesis may be carried out at 100° C. to 200° C., 100° C. to 180° C., 120° C. to 160° C. or 130° C. to 160° C. for 0.5 days to 15 days, 1 day to 15 days or 1 day to 10 days. Under the second condition, the hydrothermal synthesis may be carried out at 100° C. to 200° C., 100° C. to 180° C., 120° C. to 160° C. or 130° C. to 150° C. for 0.5 days to 15 days, 1 day to 15 days or 1 day to 11 days.

After the second zeolite formation step, the method may further include a rapid thermal treating step in which the resulting zeolites are heated for 10 seconds to 5 minutes at a temperature of 700 to 1200° C.

The rapid thermal treating step as described above may allow the zeolites to shrink and the support to expand to reduce a width of each of cracks in the zeolites, thereby improving gas-permselectivity.

Hereinafter, Examples of the present disclosure are described. However, the following Examples are only preferred examples of the present disclosure, and the scope of the right of the present disclosure is not limited to the following Examples.

EXAMPLES

The zeolite of each of Present Examples 1 and 2 and Comparative Examples 1 to 11 of the present disclosure was synthesized as follows, and the results are summarized in Table 1 below.

Synthesis of MWW Type Zeolite Particles

First, NaOH (98% pellet, Sigma-Aldrich) and sodium aluminate (NaAlO2, Sigma-Aldrich) were added to deionized (DI) water in a plastic bottle. Hexamethyleneimine (HMI, 97% Sigma-Aldrich) was subsequently added to the mixture. Fumed silica (CAB-O-SIL® M-5, Cabot Corporation) was slowly added to the above solution while stirring. The final mass composition of the synthetic mixture was 1SiO2:0.1NaOH:0.03NaAlO2:0.8HMI:13.1H2O. The mixture was vigorously mixed using a shaker overnight and transferred to a Teflon liner. The Teflon liner was mounted in an autoclave, which was placed in a rotating rack inside an oven preheated to 135° C. The reaction was conducted for 11 days with rotation at 40 rpm. After the reaction, the autoclave was quenched by cooling with tap water. The resulting MCM-22(P) was recovered using five centrifugation and washing cycles. The MCM-22(P) powder was further calcined at 550° C. for 12 h at a ramp rate of 1° $C.\cdot min^{-1}$ under 200 $mL\cdot min^{-1}$ air flow, yielding MCM-22 particles.

MCM-22 Seed Layer Formation

Specifically, approximately 0.05 g of calcined MCM-22 particles, 40 mL of anhydrous toluene, and an $\alpha$-$Al_2O_3$ disc (sandwiched between cover glasses and vertically positioned with the help of a Teflon holder) were placed sequentially in a dried glass reactor. Subsequently, the glass reactor was sealed with parafilm, and sonication (UC-10P, JEIO Tech, South Korea) was conducted for approximately 20 min. After sonication was performed, the $\alpha$-$Al_2O_3$ disc was recovered and briefly washed with fresh toluene. The resulting MCM-22 seed layer was calcined by heating to 450° C. for 12 h at a ramp rate of 0.5° $C.\cdot min^{-1}$ under 200 $mL\cdot min^{-1}$ air flow. The MCM-22 seed layer is referred to as a layer M (Comparative Example 1).

Secondary and Tertiary Growth for Formation of Hybrid Films

The MCM-22 seed layer (i.e., layer M) was further exposed to secondary hydrothermal growth. First, the synthetic sol for the synthesis of DDR zeolites was prepared. The molar composition of the final sol was 9 1-adamantylamine (97%, Sigma-Aldrich):150 ethylenediamine (99%, Sigma-Aldrich):100 fumed silica (CAB-O_Sil, M5): $4000H_2O$. Second, the layer M was placed on a Teflon liner with the help of a Teflon holder; the seeded surface was tilted and positioned facing downward. Third, the prepared solution was poured into the Teflon liner in a stainless steel autoclave. The autoclave was placed in a rack in an oven preheated to 160° C. and the reaction was carried out for 1, 2, or 3 days and quenching was performed via cooling with tap water. The recovered layer M was washed extensively with DI water and calcined at 550° C. for 12 hours at a ramp rate of 0.5° $C.\cdot min^{-1}$ under 200 $mL\cdot min^{-1}$ air flow. The recovered $\alpha$-$Al_2O_3$ disc is denoted as layer MD_xd (Comparative Examples 2 to 4) where M, D, and x indicate a MCM-22 seed layer and DDR zeolite, and the hydrothermal reaction time in days (1, 2, or 3), respectively.

The calcined layer MD was inter-grown using a synthetic precursor that allows for the synthesis of ZSM-58 (DDR type zeolite). We placed the calcined MD layer into a synthesis precursor solution containing methyltropinium iodide (MTI). Then, hydrothermal synthesis is performed. Thus, a hydrophobic DDR zeolite-based gas separation membrane having a continuous out-of-plane orientation was grown in a 3 dimensional manner Specifically, LUDOX HS-40 (40 wt % suspension in $H_2O$, Sigma-Aldrich) serving as a silica source and methyltropinium iodide as the structure directing agent (SDA) were added to deionized water. The precursor solution thus prepared was mixed with each other for 1 hour using a stirrer. After NaOH was further added thereto, the solution was mixed well using a stirrer overnight. The molar composition of the synthesized precursor solution prepared in this way was 100 $SiO_2$: 25MTI: 30 NaOH: $4000H_2O$. We placed the alpha-alumina disc on which the calcined MD layer was formed into the precursor solution prepared in this way. The hydrothermal reaction was carried out in an oven preheated at 130° C. for 5 or 10 d and completed by quenching with tap water. The resulting membranes were soaked in DI water in an effort to remove any impurities and then dried in an oven at 100° C. overnight. The resulting membranes are referred to as MDZ_xd (Comparative Examples 5 and 6), where M, D, and Z represent MCM-22, DDR, and ZSM-58 zeolites, respectively, and x indicates the hydrothermal reaction time (in days) for tertiary growth.

Rapid Thermal Processing and Activation of Zeolite Membranes

To control defect structures, rapid thermal processing (RTP), as reported in the previous literature was used to treat as-synthesized membranes (MDZ_5d or MDZ_10 d). Specifically, an as-synthesized membrane was placed in a quartz tube under argon flow of 200 $mL\cdot min^{-1}$ and the preheated furnace (nominally around 1000° C.) was quickly moved toward the membrane. After 1 min, the furnace was moved away from the membrane. The membranes both receiving and not receiving RTP treatment were further calcined at 550° C. for 12 h at a ramp rate of 0.5° $C.\cdot min^{-1}$ under an air flow of 200 $mL\cdot min^{-1}$. The RTP-treated MDZ membranes are denoted MDZ_xd_RC (Present Examples 1 and 2), where R and C in RC stand for the rapid thermal processing and the subsequent conventional slow calcination, respectively. In contrast, MDZ membranes not subjected to the RTP treatment are referred to as MDZ_xd_C (Comparative Examples 7 and 8) where C represents the conventional slow calcination.

Figure 4:
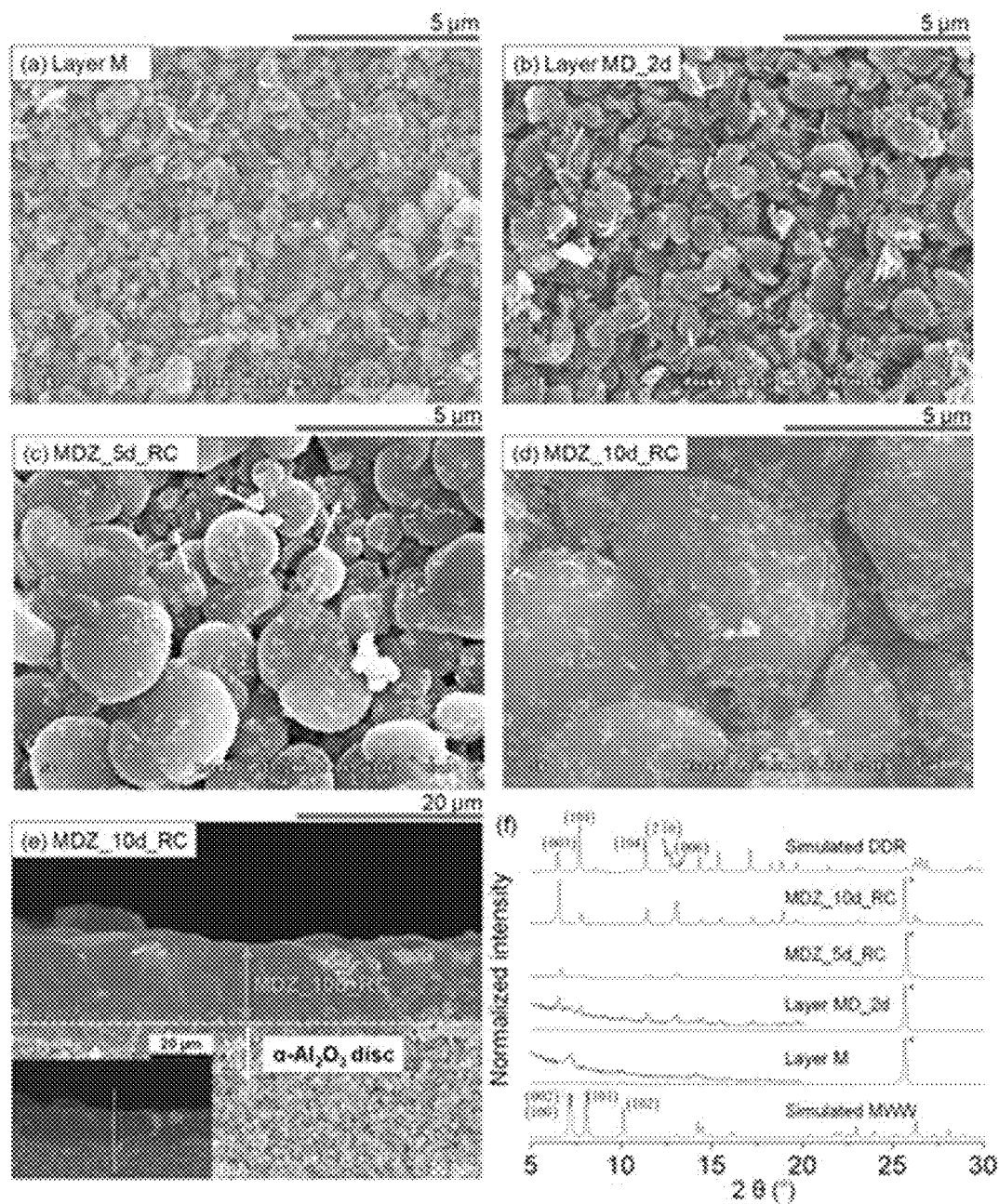
FIG. 4 shows images (a) to (e) taken with a scanning electron microscope (SEM) of a gas separation membrane according to one embodiment of the present disclosure and a graph (f) obtained by X-ray diffraction analysis thereof.

In addition, we attempted to evaluate the structural compatibility for the heteroepitaxial growth of DDR/MWW. To achieve this evaluation, the layer M was exposed to the secondary hydrothermal growth of the MFI type zeolite. The synthetic sol for the MFI zeolites was prepared following a previous report. The molar composition of the synthetic sol was 40 $SiO_2$ (tetraethyl orthosilicate, reagent grade, Sigma-Aldrich): 9 tetrapropylammonium hydroxide (1.0 M in $H_2O$, Sigma-Aldrich): 9500 DI water: 160 ethanol. The resulting sol was poured into a Teflon-lined autoclave in which layer M had been positioned as mentioned above. The autoclave was placed in a preheated oven at 175° C. and the reaction was carried out for 1, 3, and 5 d. The recovered layer M was washed with DI water and, further, calcined at 550° C. for 12 h at a ramp rate of 0.5° C.·$min^{-1}$ under 200 mL·$min^{-1}$ air flow. For convenience, the resulting layer is referred to as layer MM_xd (Comparative Examples 9 to 11) where M and M denote the MCM-22 and MFI zeolites, respectively, and x indicates the hydrothermal reaction time in days (1, 3, or 5), respectively.

growth of the seed particles ((b) in FIG. 4). Nevertheless, the rounded morphology of the seed particles changed to a sharp morphology with hexagonal edges. This indicates heteroepitaxial growth following the unit cells of the MWW type zeolites. Although the space groups of the MWW and DDR type zeolites (see their structures in Schemes 1-2) are slightly different; hexagonal P6/mmm48 and R3m, respectively (both having a=b≠c and α=90°, β=90°, and γ=120°; MWW zeolite with a: 14.3900 Å, b: 14.3900 Å, and c: 25.1980 Å & DDR zeolite with a: 13.7950 Å, b: 13.7950 Å, and c: 40.7500 Å), the heteroepitaxial growth of the DDR zeolite from the ab-plane of the MWW zeolite was seemingly achieved along the c-axis. It appears that structural compatibility between the MWW and DDR type zeolites was met along the c-axis and allowed for this heteroepitaxial growth. Despite the plausible epitaxial growth, the degree of secondary growth was not pronounced, indicating that heteroepitaxial growth was difficult. As the secondary growth time was increased from 1 to 3 d, the sharp hexagonal morphology monotonically increased. However, the concomitant growth of vertically-grown-plates on the hexagonal plane in the MD_xd layers with increased secondary growth time led to the period of 2 d being chosen as the

TABLE 1

| | Denotation | Seed layer | Secondary growth | Tertiary growth | RTP |
|---|---|---|---|---|---|
| Comparative Example 1 | Layer M | ○ | X | X | X |
| Comparative Example 2 | MD_1d | ○ | 1 day(DDR) | X | X |
| Comparative Example 3 | MD_2d | ○ | 2 days(DDR) | X | X |
| Comparative Example 4 | MD_3d | ○ | 3 days(DDR) | X | X |
| Comparative Example 5 | MDZ_5d | ○ | 3 days(DDR) | 5 days | X |
| Comparative Example 6 | MDZ_10d | ○ | 3 days(DDR) | 10 days | X |
| Comparative Example 7 | MDZ_5d_C | ○ | 3 days(DDR) | 5 days | Conventional calcination |
| Comparative Example 8 | MDZ_10d_C | ○ | 3 days(DDR) | 10 days | Conventional calcination |
| Comparative Example 9 | MM_1d | ○ | 1 days(MH) | X | X |
| Comparative Example 10 | MM_2d | ○ | 2 days(MH) | X | X |
| Comparative Example 11 | MM_3d | ○ | 3 days(MH) | X | X |
| Present Example 1 | MDZ_5d_RC | ○ | 3 days(DDR) | 5 days | ○ |
| Present Example 2 | MDZ_10d_RC | ○ | 3 days(DDR) | 10 days | ○ |

Experimental Example

Figure 7:
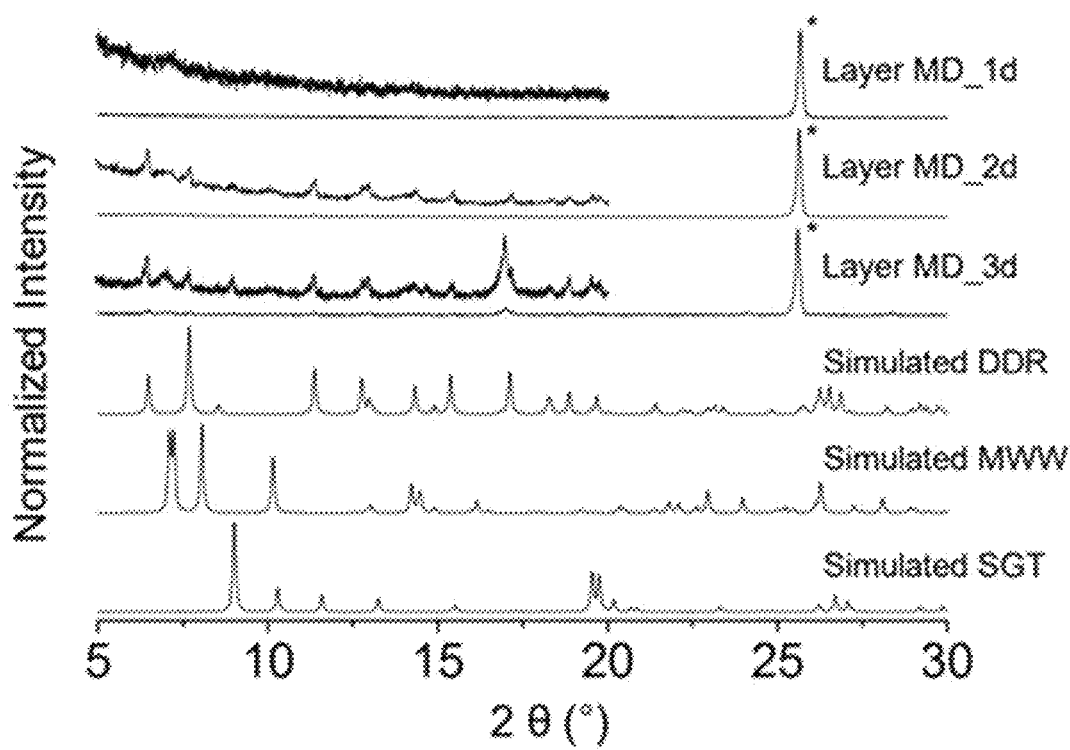
FIG. 7 is a graph of X-ray diffraction analysis of a gas separation membrane according to another embodiment of the present disclosure.

Gas Separation Membrane Characteristics (a) in FIG. 4 shows that the disc-like MCM-22 particles having large ab-basal planes were uniformly deposited on a porous support using the sonication-assisted method and, accordingly, constituted a continuous, compact seed layer, which is a prerequisite in the secondary growth methodology. In particular, the pronounced number of MCM-22 particles with their ab-planes parallel to the support surface suggests that a preferential out-of-plane orientation (in this case, the c-axis aligned in the direction perpendicular to the membrane surface) was achieved. This c-out-of-plane orientation was confirmed by the corresponding X-ray diffractometry (XRD) measurements (see (f) in FIG. 4). The subsequent growth of the seed layer with a precursor that allowed for the synthesis of DDR zeolites led to the slight optimal time for the formation of the MD layer because it was intermediate between the formed MD_1d and MD_3d layers. In addition, although no pronounced morphological changes in layer MD_2d were observed, the prolonged growth resulted in the undesired growth of a new phase (FIG. 7). This new phase was likely the SGT type zeolite, because it is known to grow in a competitive manner with the DDR zeolite.

Thus, we focused on investigating the structural properties of layer MD_2d. Le Bail refinement was used to fit the XRD pattern of layer MD_2d based on a combination of MWW and DDR type zeolites and the results suggested that this layer was mainly constituted by the DDR zeolite (refer to FIG. 8). However, the Le Bail refinement could not account for the additional XRD peak, which seemingly arose from the aforementioned SGT zeolite phase. Furthermore, we detached particles from layer MD_2d by sonication to analyze via transmission electron microscopy (TEM). Indeed, the sharp-edged particles could be clearly seen, as shown in (b) in FIG. 8, indicating that they were grown from the disc-like MCM-22 deposits. A high-resolution TEM image ((c) in FIG. 8) was obtained in the region of the sharp-edges observed in (b) in FIG. 8 and the data were subjected to fast Fourier transformation (FFT); the result is shown in FIG. 2d. Along with the FFT patterns arising from the [001] zone axis of MWW type zeolites, additional patterns that were likely to belong to the DDR zeolite (indicated by white arrows) were observed. This was supported by the simulated FFT patterns with respect to the [001] zone axes of the MWW and DDR zeolites (given in the inset of (d) in FIG. 8).

Figure 6:
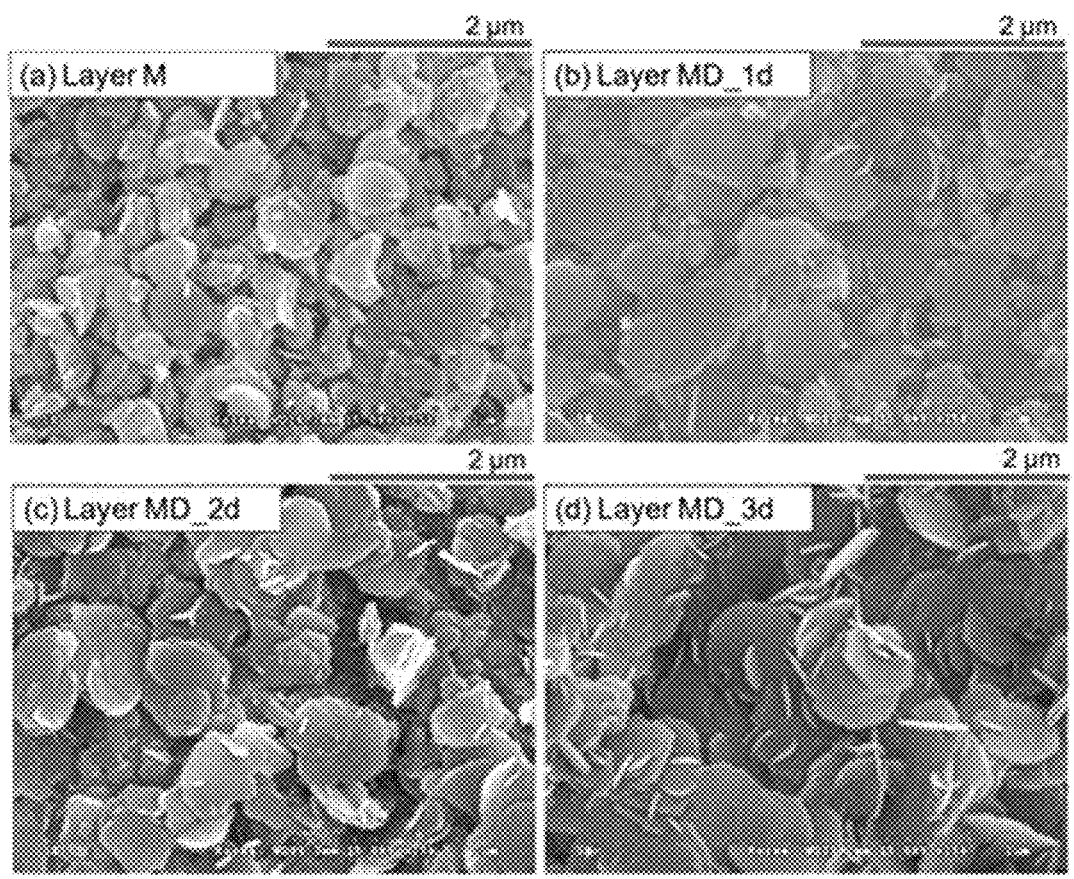
FIG. 6 is an image taken with a scanning electron microscope (SEM) of a gas separation membrane according to another embodiment of the present disclosure.
Figure 8:
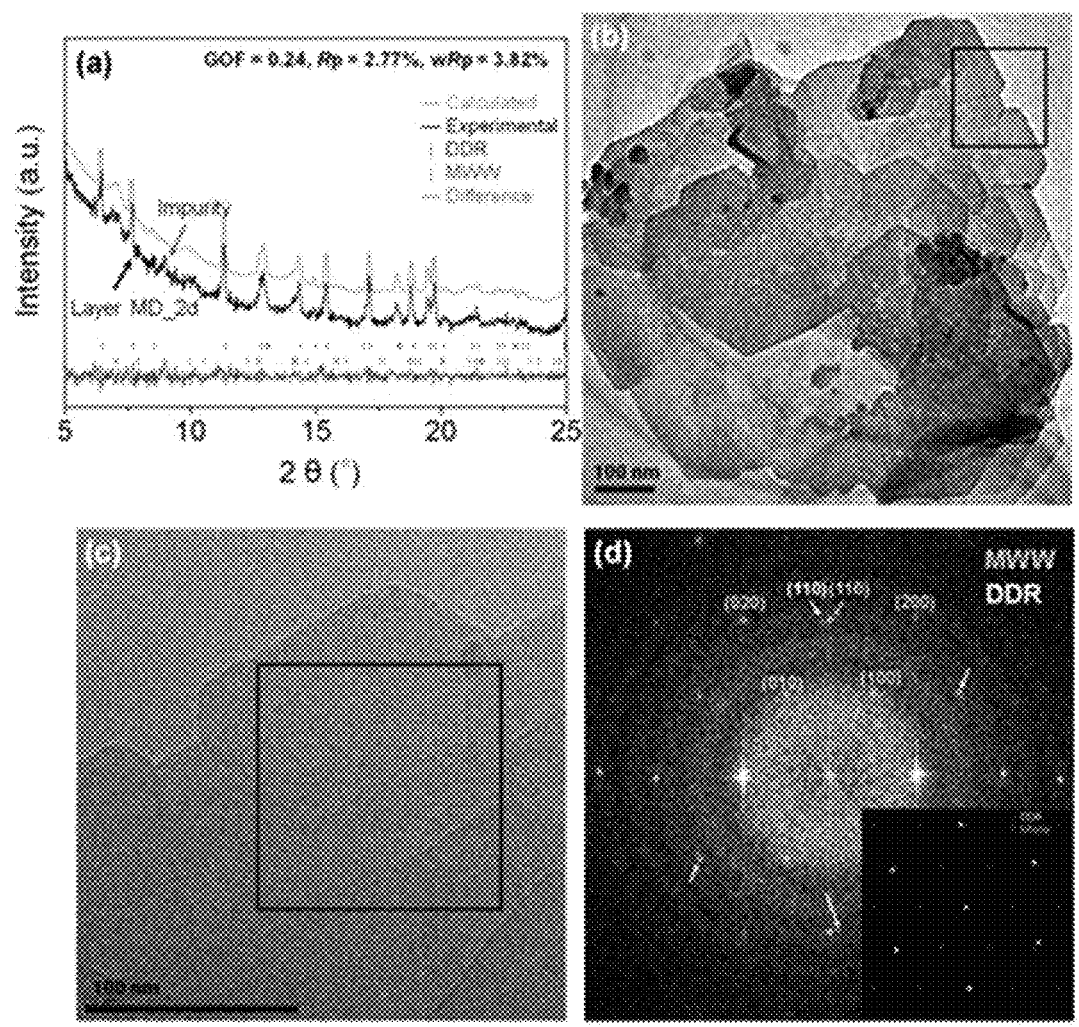
FIG. 8 shows a graph (a) of X-ray diffraction analysis of a gas separation membrane according to one embodiment of the present disclosure, a transmission electron microscope (TEM) image (b) thereof, a high-resolution transmission electron microscope (HR-TEM) image (c) thereof, and a fast Fourier transform (FFT) pattern (d) thereof.

Although the hexagonal-shaped growth from the disc-like MCM-22 deposits could be inferred from the scanning electron microscopy (SEM) images of layer MD_2d in (b) in FIG. 4 and FIG. 6 and its corresponding DDR zeolite growth was observed in the XRD pattern shown in (f) in FIG. 4, the TEM analysis in (d) in FIG. 8 also indicated the heteroepitaxial growth (DDR/MWW) for the formation of layer MD_2d. The subsequent hydrothermal growth of layer MD_2d with a precursor that allowed for the synthesis of ZSM-58 zeolite (DDR type zeolite) clearly led to some intergrown layers in MDZ_5d ((c) in FIG. 4 and (a) and (b) in FIG. 9) and, further, a continuous membrane in MDZ_10d ((d) to (e) in FIG. 4 and (c) and (d) in FIG. 9). However, non-intergrown parts in MDZ_5d were easily found, as indicated by white arrows in (c) in FIG. 4. In addition, the proportion of the ZSM-58 zeolite in the membrane increased with increasing growth duration from 5 to 10d, as supported by the increase in the corresponding XRD peak intensities ((f) in FIG. 4 and FIG. 10).

In particular, the morphology of the membrane grains and crystal phase of the RTP-treated membrane (MDZ_10d_RC) were indistinguishable to those of the only slowly calcined counterpart (MDZ_10d_C) (Comparative Example 8) (FIG. 9 and FIG. 10) Intriguingly, the intensity of the XRD peak corresponding to the (003) plane in MDZ_10d was increased significantly, indicating that some c-out-of-plane orientation had been achieved. (f) in FIG. 4 and FIG. 7 clearly reveal that this c-out-of-plane orientation had already been in layer MD and the quantity monotonically increased with increasing secondary growth time from the MCM-22 seed layer (i.e., layer M). Such c-out-of-plane orientation was expected to occur from the disc-shaped MCM-22 particles constituting layer M and their growth into the sharp-edged hexagonal plates (FIG. 6).

Figure 10:
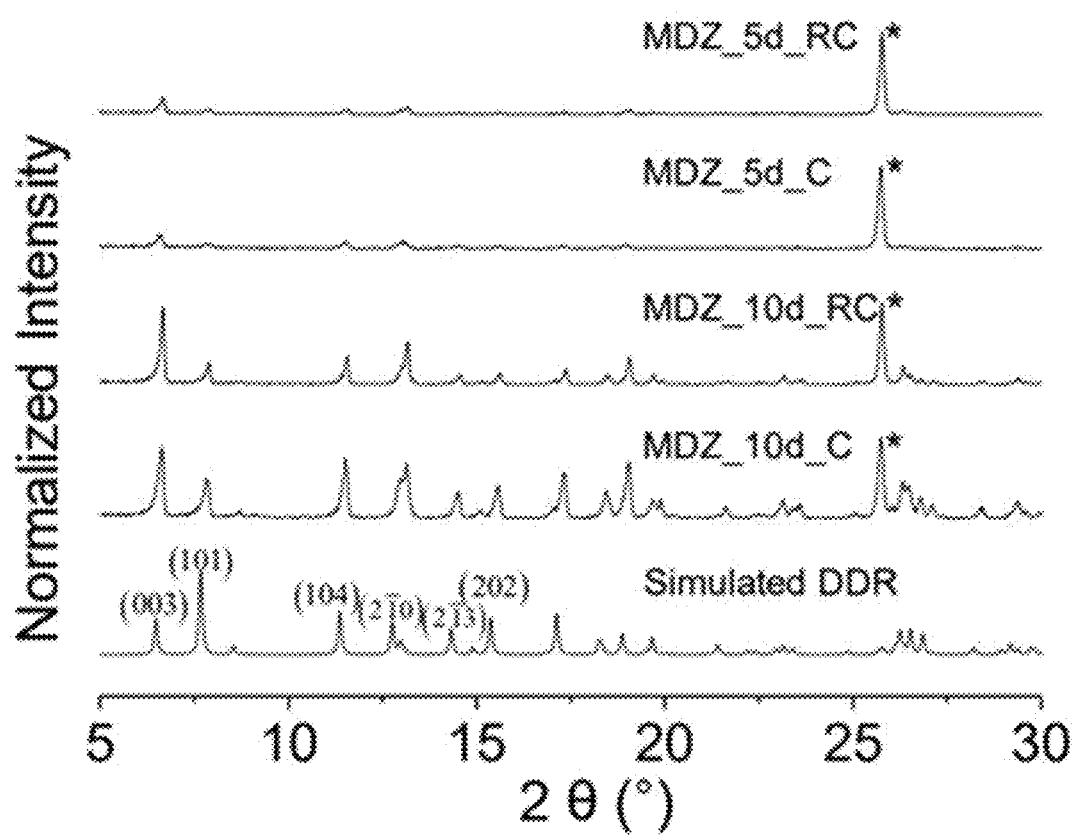
FIG. 10 is a graph of X-ray diffraction analysis of a gas separation membrane according to another embodiment of the present disclosure.

Referring to FIG. 10, additional hydrothermal growth of layer MD_2d from 5 to 10 d favored the development of the c-out-of-plane orientation, while preserving the c-out-plane orientation in layer MD_2d. This oriented growth indicates epitaxial growth from the hexagonal plates in the presence of the precursor that allowed for the synthesis of the ZSM-58 zeolite. Specifically, the crystallographic preferred orientation (CPO) index for MDZ_10 was estimated to be as high as 7.6±3.9, demonstrating the pronounced alignment of the c-axis in the out-of-plane direction.

Figure 11:
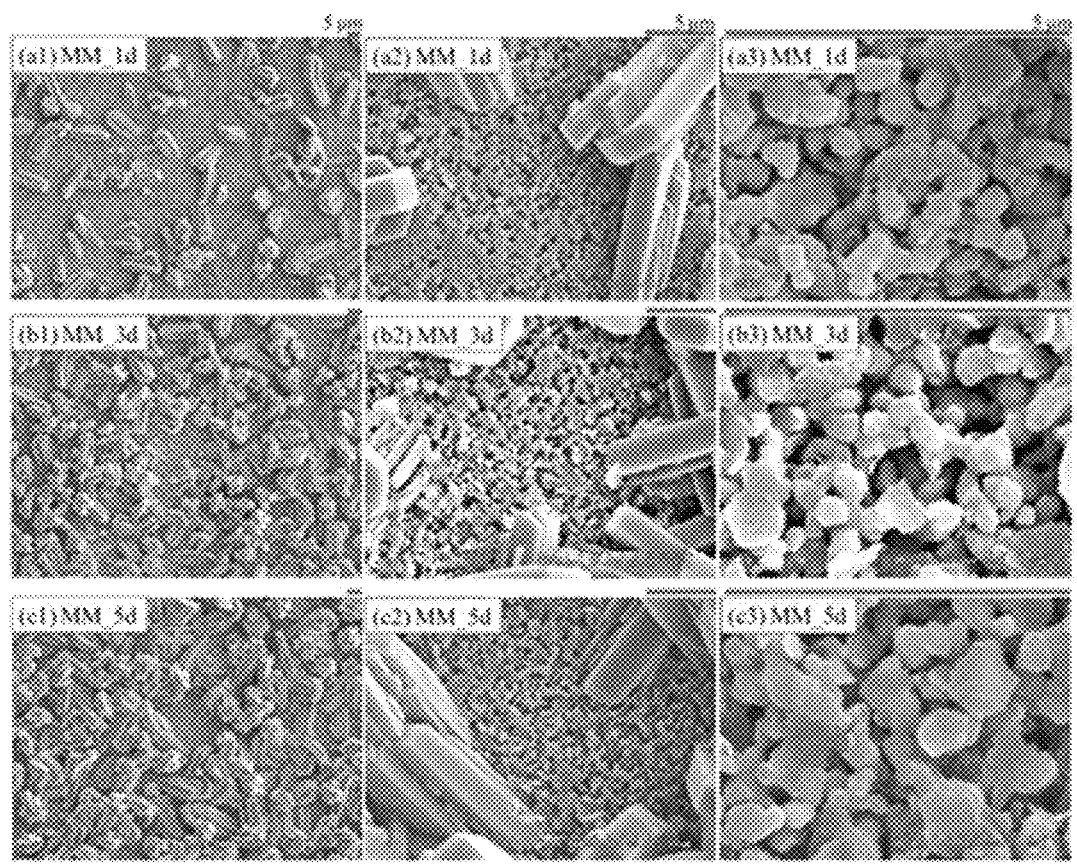
FIG. 11 is an image taken with a scanning electron microscope (SEM) of a gas separation membrane according to Comparative Example of the present disclosure.

In an effort to confirm the heteroepitaxial growth, we also conducted the secondary growth of the MCM-22 seed layer with a synthetic precursor that led to silicalite-1 (i.e., all-silica MFI type zeolite). Although the MFI zeolite is known to easily form in the presence of tetrapropylammonium (TPA) cations, the resulting layer was not continuous (FIG. 11), showing the difficulty in closing the gap between the deposited MCM-22 particles. This, in turn, strongly supports the requirement for the structural similarity or compatibility of the two types of zeolites in achieving heteroepitaxial-growth-based membrane formation.

Figure 5:
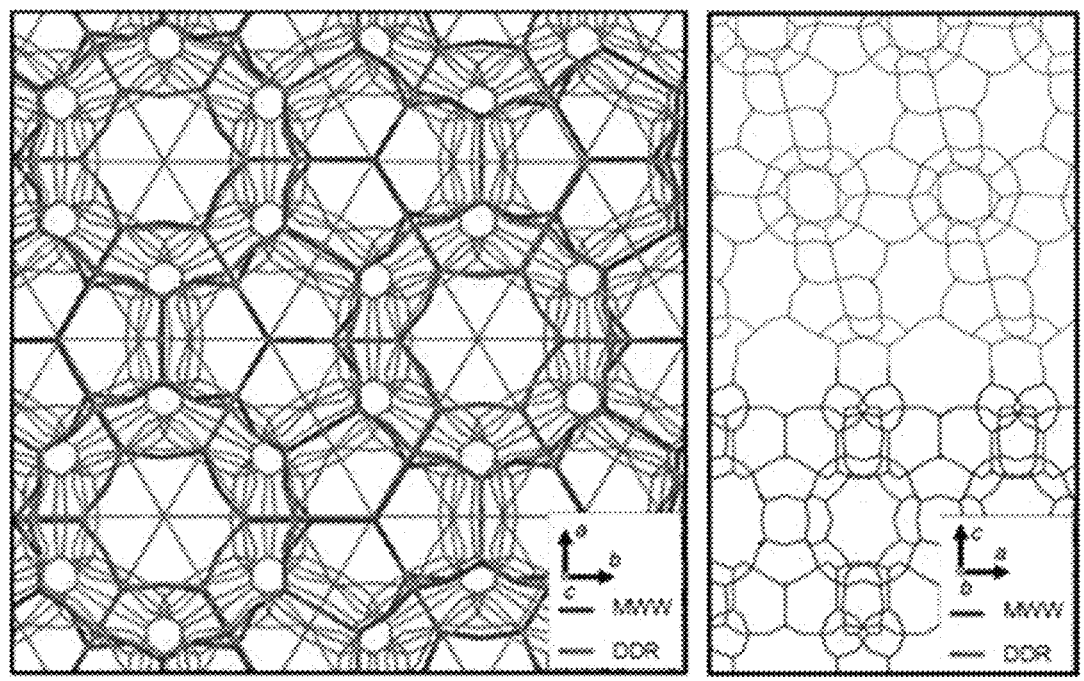
FIG. 5 is an image showing a schematic structure model in which DDR type zeolite is epitaxially grown from MWW type zeolite at an interface of the gas separation membrane according to one embodiment of the present disclosure.

FIG. 5 shows schematic representation of MWW and DDR type zeolites and a plausible model of the structural compatibility via the 6-MR apertures along the c-axis between these two zeolites. The 6-MR windows in the DDR zeolites also present along the c-axis are positioned in the plane perpendicular to the c-axis in the hybrid membrane of MDZ_10 d. Accordingly, the preferentially c-out-of-plane oriented hybrid membrane (i.e., MDZ_10 d) had a significant number of 6-MR pore apertures in the out-of-plane direction. Thus, this membrane is a good platform to use for evaluating the molecular sieving ability of the 6-MR apertures for the separation of $H_2$ from $CO_2$, particularly considering that neither membrane-based experiments nor theoretical demonstrations based on the 6-MR pore aperture have been reported thus far.

Separation Performances of the Hybrid Membrane

Figure 9:
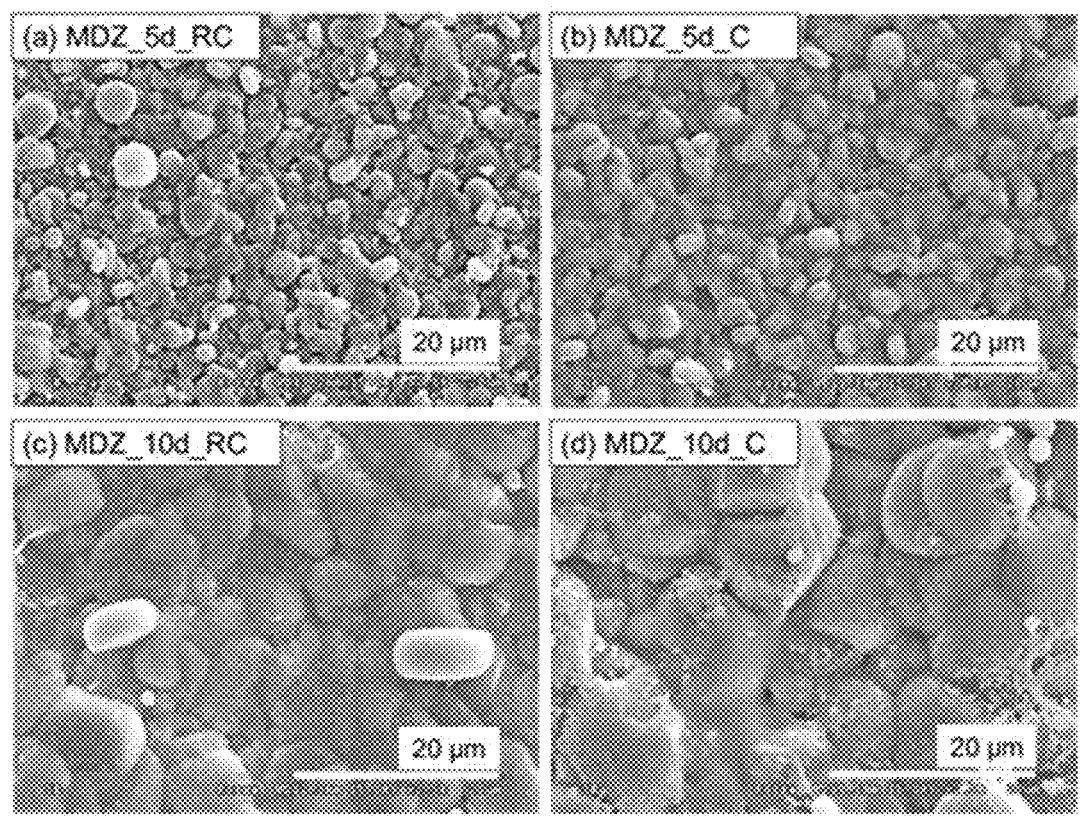
FIG. 9 is an image taken with a scanning electron microscope (SEM) of a gas separation membrane according to another embodiment of the present disclosure.
Figure 12:
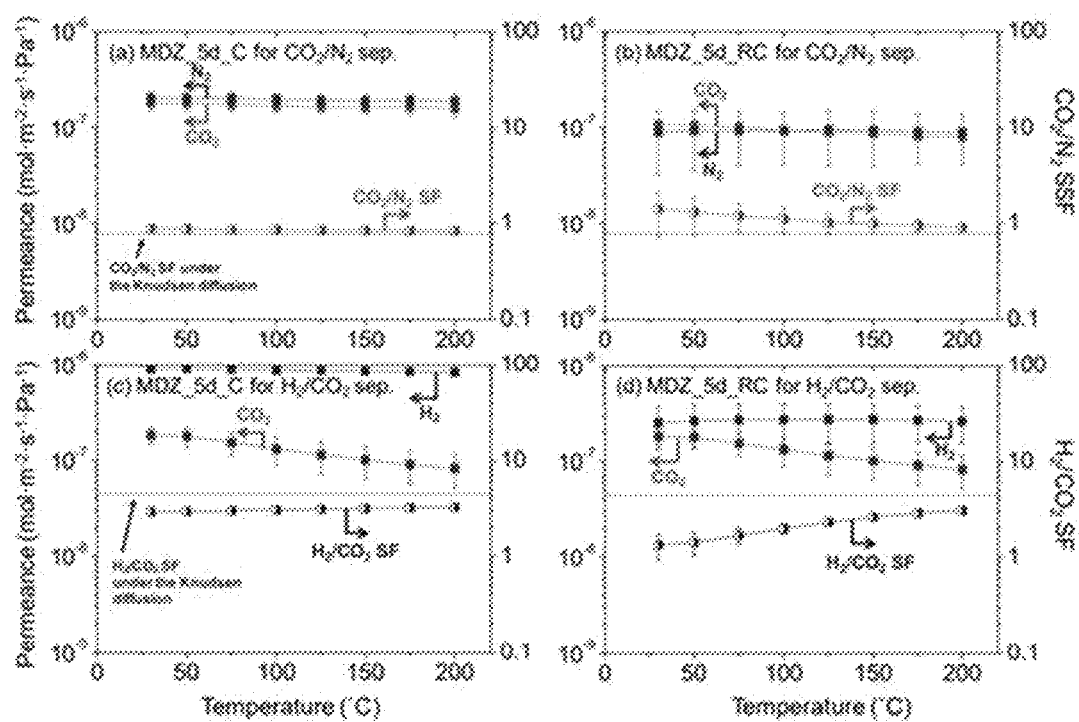
FIG. 12 is a graph identifying carbon dioxide separation capability of a gas separation membrane according to one embodiment of the present disclosure.

As expected from the discontinuity observed via SEM ((c) in FIG. 4 and (a) and (b) in FIG. 9), neither MDZ_5d_RC nor MDZ_5d_C exhibited any molecular sieving abilities (FIG. 12). Although RTP helped in achieving a slight increase in the separation performances, the degree of intergrowth in MDZ_5d was not sufficient to secure any molecular sieving ability.

Figure 13:
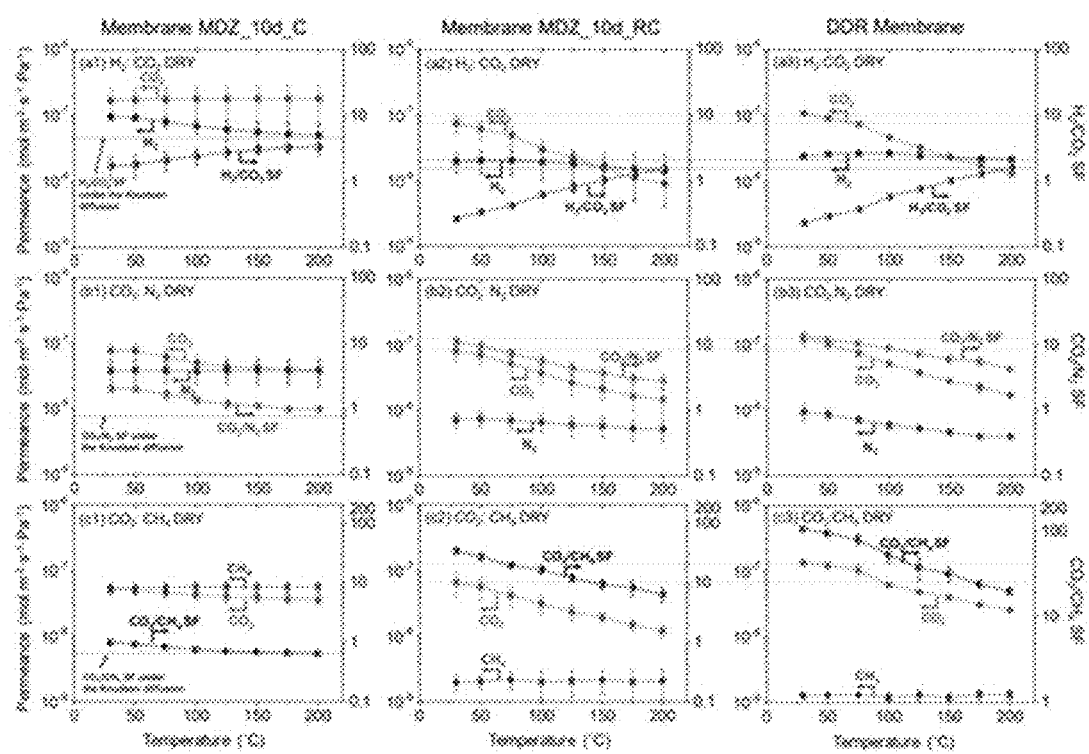
FIG. 13 is a graph identifying carbon dioxide separation capability of a gas separation membrane according to another embodiment of the present disclosure.

In addition, (a1), (b1), and (c1) in FIG. 13 shows that MDZ_10d_C, which was conventionally calcined, exhibited poor separation performance for all three pairs of gases ($H_2/CO_2$, $CO_2/N_2$, and $CO_2/CH_4$), indicating the pronounced presence of defects. Despite the apparent membrane continuity at the SEM resolution ((d) in FIG. 9), MDZ_10d_C showed very poor permselective ability, supporting the importance of the calcination method of the as-synthesized films or layers. In contrast, the RTP-treated counterpart (i.e., MDZ_10d_RC) exhibited considerably improved permselectivities particularly for $CO_2$ in all three cases, indicating that RTP contributed to decreasing the degree of defects. In addition, despite the expectation of a significant contribution of the 6-MR pore apertures in MDZ_10d_RC for favorable $H_2$ permeation, the corresponding $H_2/CO_2$ separation factor (SF) was ca. 0.37 (less than 1) at 30° C. and only increased to ca. 0.97 at 125° C. Furthermore, the max $H_2/CO_2$ SF was still very low (ca. 1.7) at 200° C. This suggests that the 6-MR pore aperture (the max size of which is 0.28 nm) is not suitable for $H_2/CO_2$ separation up to 200° C. Because the structural properties of MDZ_10d_RC were similar to those of the homogeneous DDR membranes, as reported in our previous study, the $H_2/CO_2$, $CO_2/N_2$, and $CO_2/CH_4$ separation performances of MDZ_10d_RC were comparable to those of the DDR membrane, except for the much lowered $CO_2$ permeance across MDZ_10_RC. For better comparison, the $H_2/CO_2$, $CO_2/N_2$, and $CO_2/CH_4$ separation performances of MDZ_10d_RC and the homogeneous DDR membrane are displayed together in FIG. 13 (middle and right columns). Apparently, the $CO_2$ permeances across MDZ_10d_RC were decreased by a similar extent, as compared to those of the homogeneous DDR membranes having a larger number of 8-MR channels in the direction perpendicular to the membrane surface. Therefore, it can be deduced that the 6-MR pore aperture in the DDR zeolite is not appropriate for $H_2/CO_2$ separation, though the 6-MR pore apertures in other types of zeolites (not sodalite) should also be tested to verify their molecular filtering abilities for $H_2/CO_2$ separation. In particular, $H_2/CO_2$ separation under harsh conditions (high pressures and temperatures) is critical for realizing water-gas-shift membrane reactors so that its experimental demonstration through a zeolite membrane, which can serve as a wall in the membrane reactor configuration, is required. The results of this study suggest sound approaches to achieve good $H_2/CO_2$ separation performance via a post-treatment-based pore size reduction with 8- or 10-MR zeolites.

Figure 14:
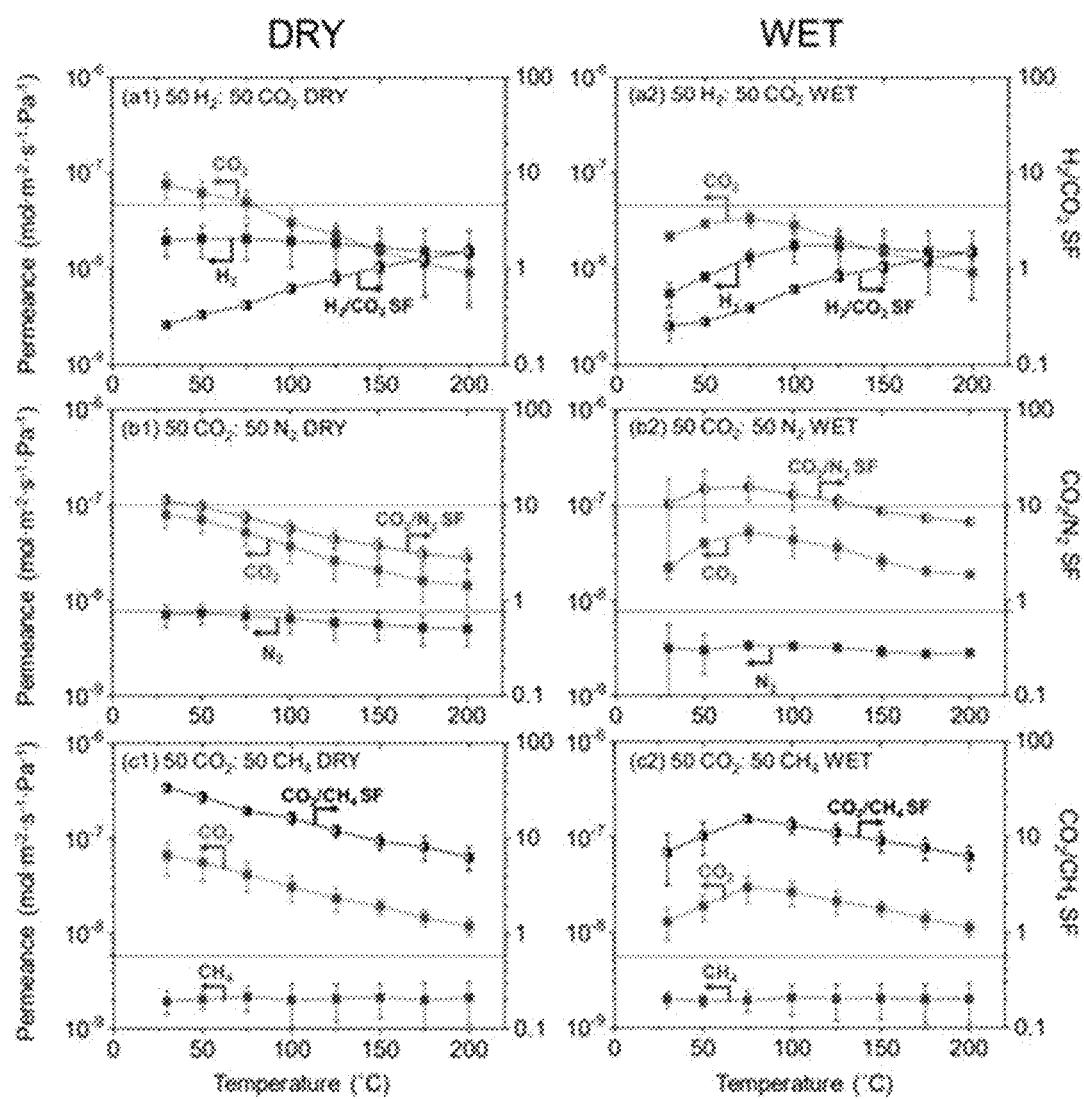
FIG. 14 is a graph identifying carbon dioxide separation ability under dry and wet conditions of a gas separation membrane according to one embodiment of the present disclosure.
Figure 15:
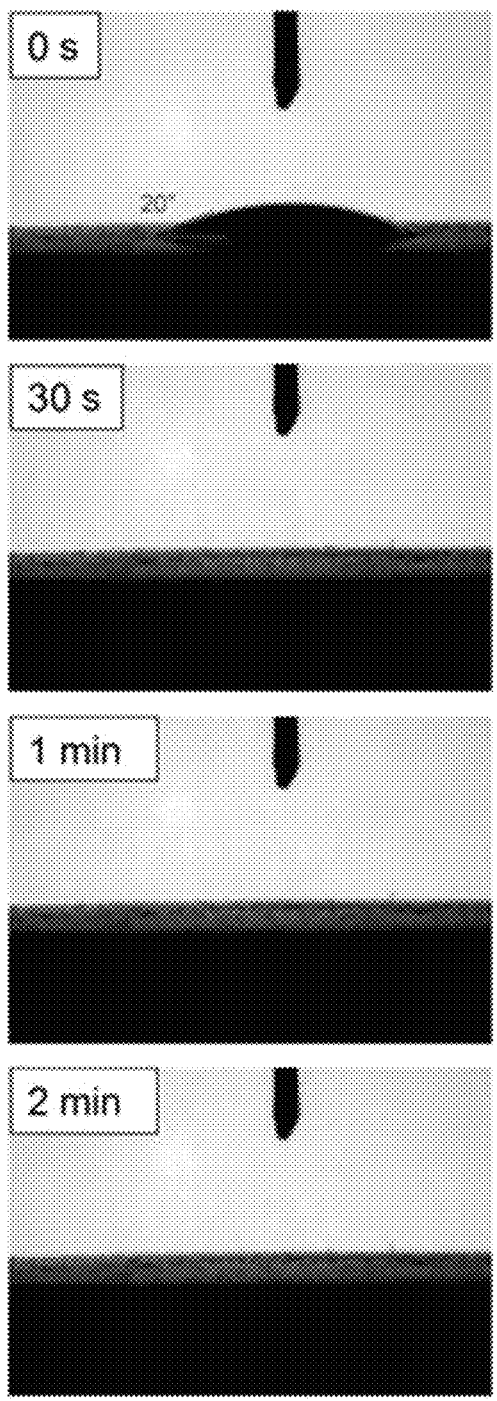
FIG. 15 is an image identifying hydrophobicity of a gas separation membrane according to one embodiment of the present disclosure.
Figure 15:
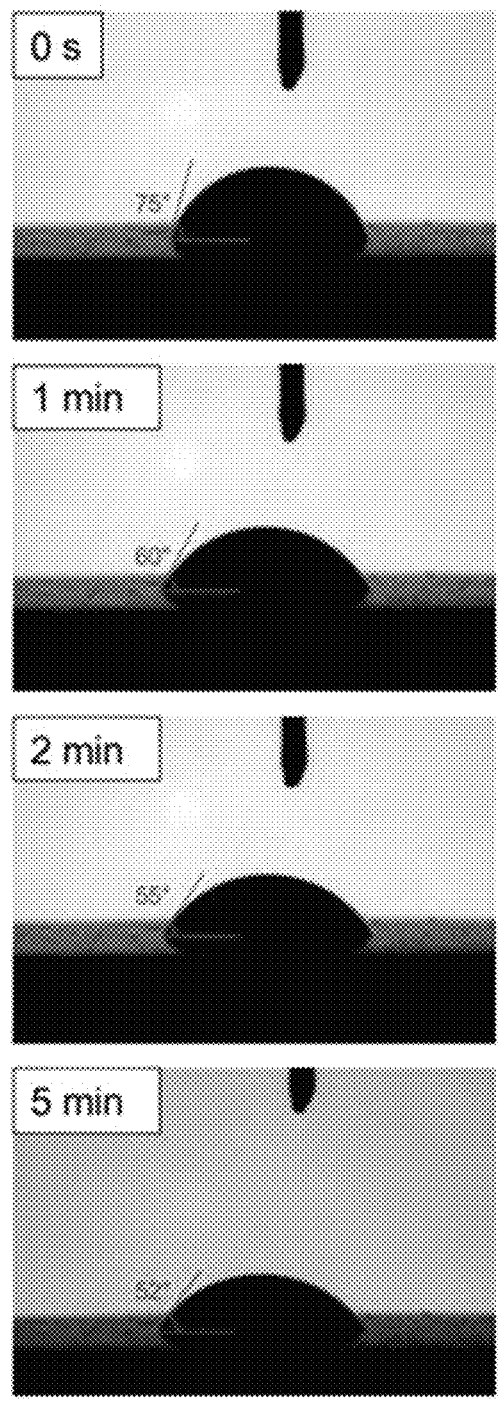

Modified MFI zeolite membranes have been used in membrane reactors and the resulting configuration showed marked $H_2$ recovery and CO conversion, presumably due to the high $H_2/CO_2$ separation factor. Furthermore, the addition of water vapor to the binary mixture feed decreased the permeance of both $H_2$ and $CO_2$ at temperatures below 100° C. where the degree of water adsorption in the DDR zeolite was pronounced ((a1) to (a2) in FIG. 14). In contrast, the $H_2$ and $CO_2$ permeances were not changed by the presence of water vapor at temperatures above 100° C. Interestingly, the degrees of permeance reduction were similar for both $H_2$ and $CO_2$ up to 200° C.; thus, the corresponding $H_2/CO_2$ SFs under wet conditions ((a2) in FIG. 14) were comparable to those under dry conditions ((a1) in FIG. 14). In addition, the water vapor in the feed increased the $CO_2/N_2$ SF at the expense of a reduced $CO_2$ permeance especially below 100° C. ((b1) to (b2) in FIG. 14). In contrast, the reduced degree of the permeance was higher for $CO_2$ than $CH_4$ in the $CO_2/CH_4$ separation, thereby decreasing the corresponding $CO_2/CH_4$ SF up to approximately 50° C. under wet conditions ((c1) and (c2) in FIG. 14). In particular, the trends in $CO_2/N_2$ and $CO_2/CH_4$ separations induced by water vapor were quite similar to those of the reported homogeneous DDR membrane. The main difference is the aforementioned lowered $CO_2$ permeance in MDZ_10d_RC, apparently arising from the significant portion of preferentially c-out-of-plane oriented DDR zeolite. The higher $CO_2/N_2$ SF under wet conditions could be ascribed to the hydrophobicity of siliceous DDR zeolites in MDZ_10d_RC (see the inset of (e) in FIG. 4), as supported by water contact angle measurements, which yielded a contact angle of 75° (FIG. 15). In contrast, in contact angle measurements of MDZ_10d_C, the water droplet quickly penetrated the sample and disappeared, indicating the presence of many defects in MDZ_10d_C (FIG. 15).

Elucidation of Defect Structures in Hybrid Membrane

Figure 16:
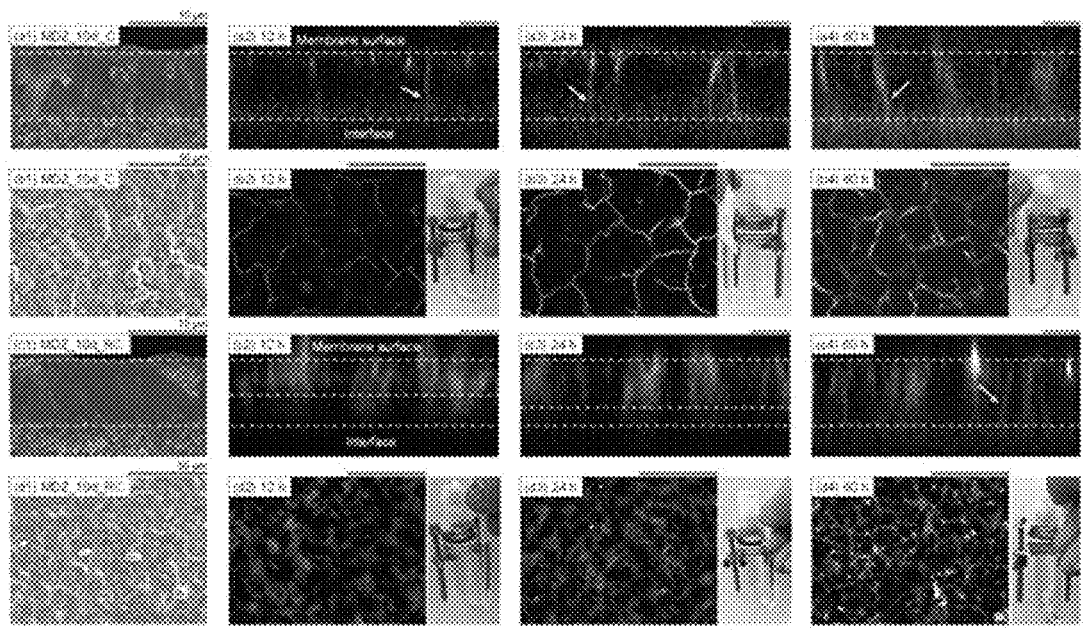
FIG. 16 shows a scanning electron microscope (SEM) image and a fluorescence confocal optical microscopy (FCOM) image of a gas separation membrane according to one embodiment of the present disclosure, where a (a) line and a (c) line are cross-sectional images, and a (b) line and a (d) line are top-view images.

FIG. 16 shows the FCOM images of MDZ_10d_C and MDZ_10d_RC, which exhibited poor and good $CO_2$-perm-selectivities, respectively. Accordingly, the corresponding degrees of defects can be reasonably regarded as high and low, respectively. Because the contribution of defects, particularly cracks, to the apparent permeation rates are coupled functions of the size (width) and number (density) of defects, these factors should be considered together to understand the final apparent performances. In addition, dyeing the membranes for different durations can provide additional information regarding the defect structure. The defects (mainly cracks) in MDZ_10d_C were increasingly and gradually infiltrated by the dye molecules with increased dyeing time. Notably, some cracks reaching the interface between the zeolite membrane and the porous support could be visualized only after 12-h dye contact (indicated by a yellow arrow in (a2) in FIG. 16). In contrast, a higher density or number of cracks existed in MDZ_10d_RC ((c2) and (d2) in FIG. 16), but these did not propagate fully to the interface (as indicated by a yellow dashed line in (c2) in FIG. 16). Prolonged dyeing of MDZ_10d_C (24 h) allowed for the visualization of more cracks that propagated all the way to the interface ((a3) and (b3) in FIG. 16). In contrast, the number of cracks in MDZ_10d_RC detected after 12-h dyeing remained the same, though more dye molecules could access the regions closer to the interface but ended in the middle (as indicated by a yellow dashed line in (c3) in FIG. 16). Finally, after 60-h dyeing, additional cracks in MDZ_10d_C that propagated to the interface were observed and a larger number or density of cracks present in MDZ_10d_RC were fully accessed by the dye molecules.

Figure 17:
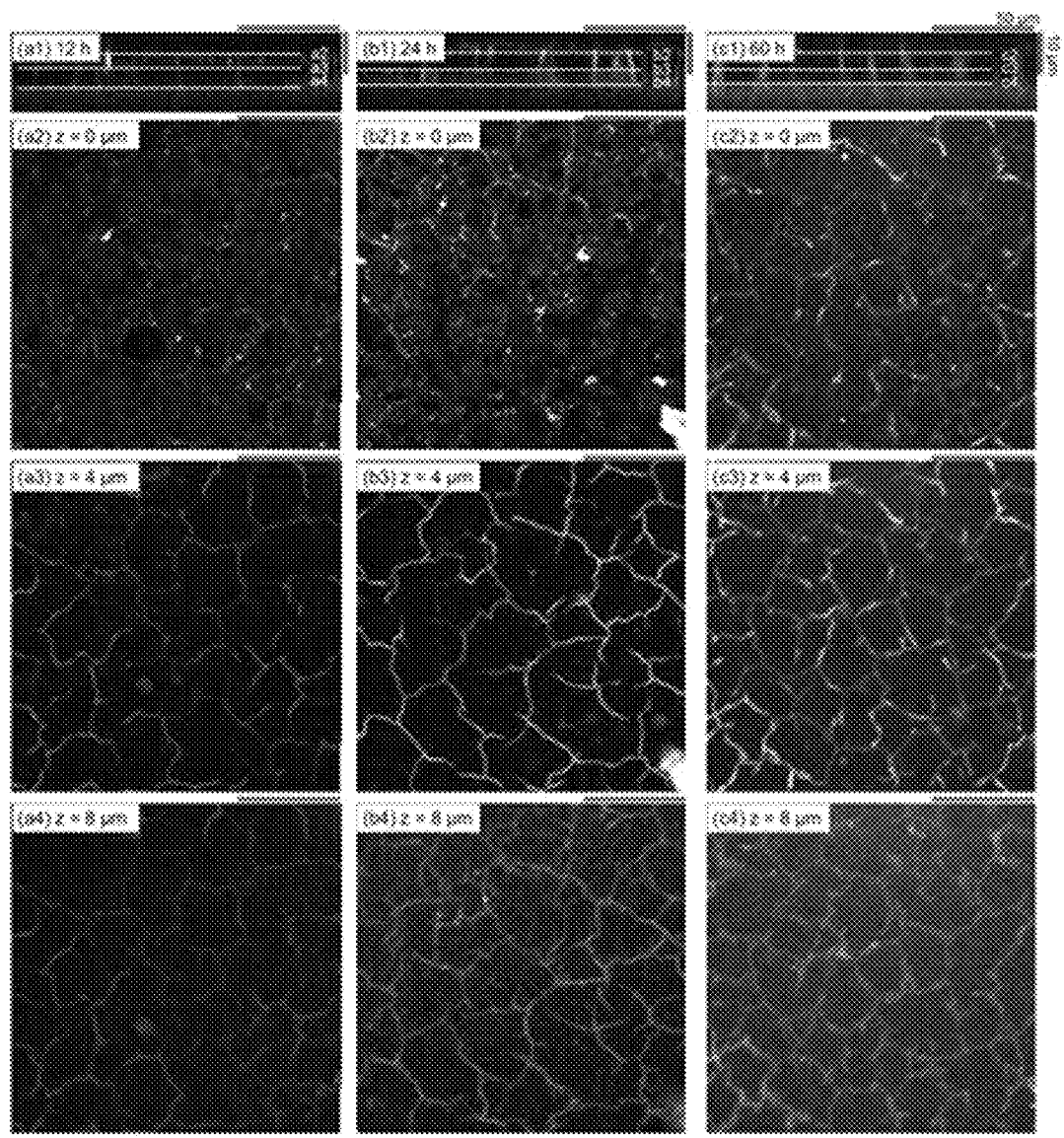
FIG. 17 is an image analyzing fluorescence confocal optical microscopy (FCOM) characteristics of a gas separation membrane according to one embodiment of the present disclosure.
Figure 18:
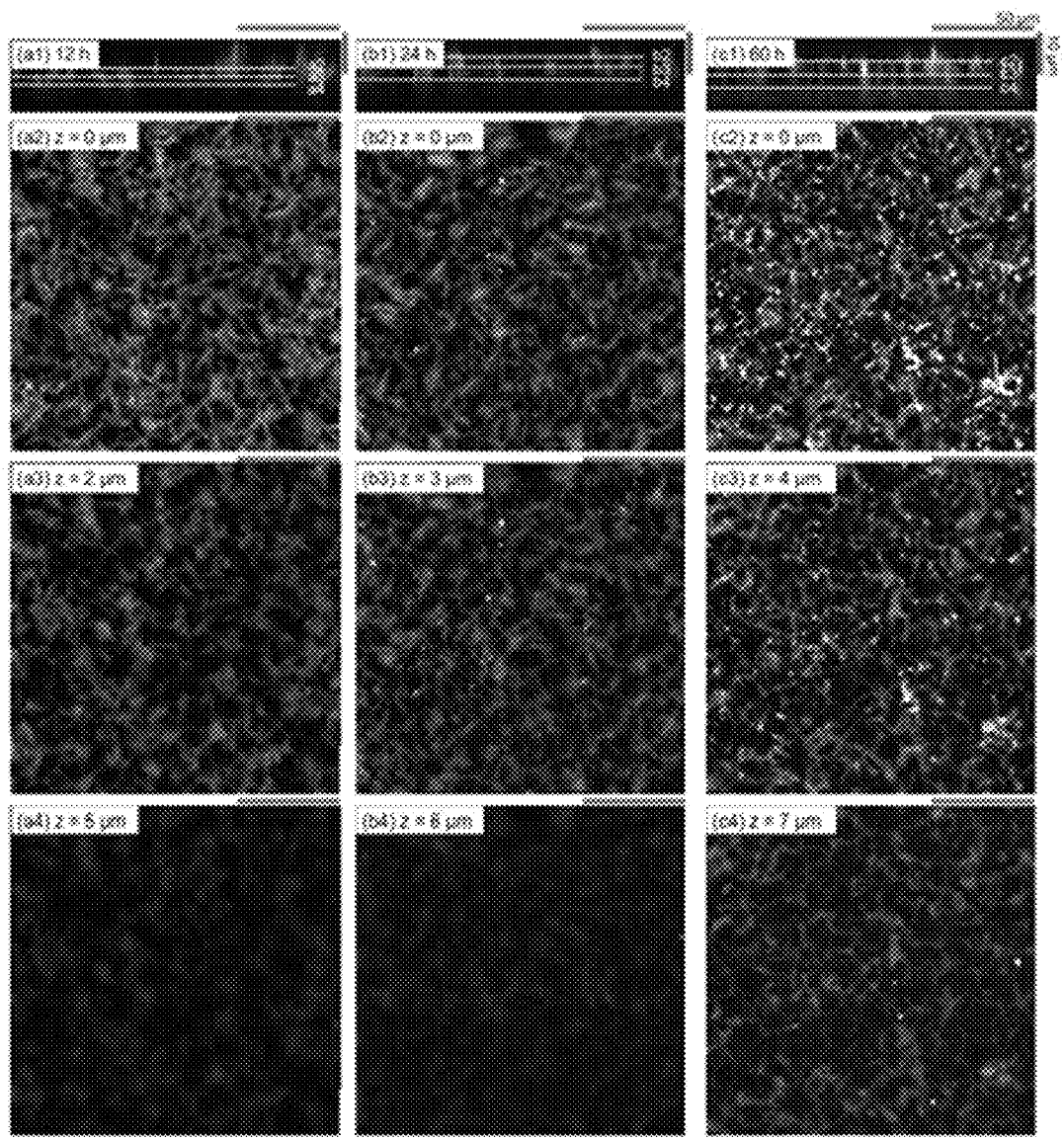
FIG. 18 is an image analyzing fluorescence confocal optical microscopy (FCOM) characteristics of a gas separation membrane according to another embodiment of the present disclosure.
Figure 19:
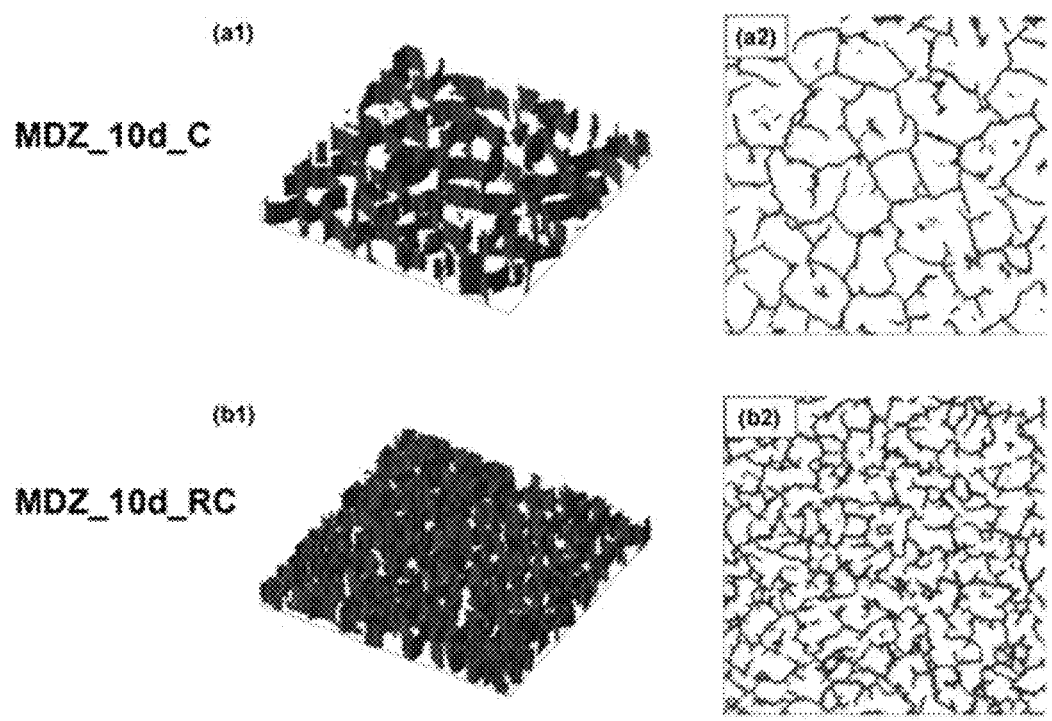
FIG. 19 is an image schematically showing a defect structure of a gas separation membrane according to one embodiment of the present disclosure.
Figure 20:
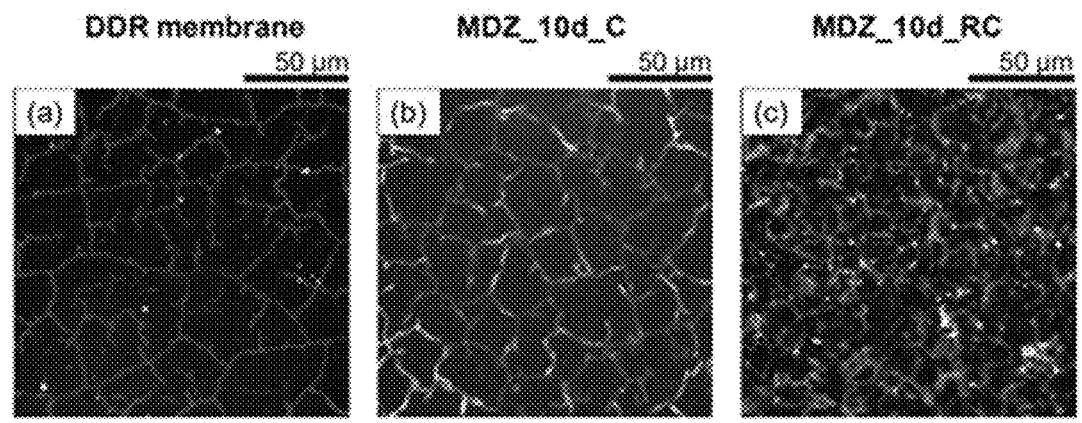
FIG. 20 is an image analyzing fluorescence confocal optical microscopy (FCOM) characteristics of a gas separation membrane according to each of another embodiment and Comparative Example of the present disclosure.

The kinetically relevant dyeing processes clearly revealed that the number and size of the cracks present in MDZ_10d_C were lower and greater than those present in MDZ_10d_RC, respectively (FIG. 17 and FIG. 18). Image processing of the FCOM images provided further confirmation of the number of defects; the pixel-based area factions corresponded to 0.020 for MDZ_10d_C and 0.035 for MDZ_10d_RC (Table 2). After image processing was completed, the crack features were well reconstructed, as illustrated in FIG. 19. Despite the differences in the crack densities, the tortuosities of the cracks along the membrane thickness were approximately 1.6 for both MDZ_10d_C and MDZ_10d_RC (Table 2), suggesting comparable, slightly-tilted pathways for the permeating components. The crack features of MDZ_10d_C were comparable to those of the homogeneous DDR membranes, whereas MDZ_10d_RC had a larger number of cracks (FIG. 20). Considering that the homogeneous DDR membrane showed high $CO_2$-perm-selectivities, the crack size in MDZ_10d_C was apparently too large to secure any molecular sieving ability. Currently, it is believed that RTP condenses the grains in a polycrystalline zeolite membrane, thereby reducing the defect size effectively.

However, FIG. 16 shows that when RTP was carried out before conventional slow calcination, stress could be released upon the removal of the SDA via the generation of a greater number of smaller cracks. Recently, it has been reported that the RTP-treatment of CHA membranes resulted in a reduction in the crack size, while the crack densities with and without the RTP-treatment were comparable. These discrepancies in the effects of the RTP-treatment strongly suggest the need for a rigorous analysis of the mechanism regarding RTP-based defect generation in zeolite membranes. In summary, although the defect number was higher in MDZ_10d_RC, which showed better separation performance than MDZ_10d_C, the reduced size of the defects is likely key for securing good separation performance

TABLE 2

| Membrane sample | Tortuosity in the z-direction; along the membrane thickness | Defect area fraction |
| --- | --- | --- |
| MDZ_10d_C | 1.57 | 0.020 |
| MDZ_10d_RC | 1.59 | 0.035 |

What is claimed is:

1. A MWW/DDR type gas separation membrane comprising at least one MWW type zeolite and at least one DDR type zeolite,
   wherein one of the MWW type zeolite and the DDR type zeolite is disposed on the other thereof,
   wherein at least one of the MWW type zeolite and the DDR type zeolite is epitaxially grown.

2. The membrane of claim 1, wherein each of the MWW type zeolite and the DDR type zeolite independently constitutes a layer, wherein a layer of the MWW type zeolite and a layer of the DDR type zeolite are vertically and repeatedly stacked alternately with each other.

3. The membrane of claim 1, wherein the MWW type zeolite has a molar ratio reference value of Si:Al in a range of 100:0 to 10.

4. The membrane of claim 1, wherein the DDR type zeolite has a molar ratio reference value of Si:Al in a range of 100:0 to 10.

5. The membrane of claim 1, wherein the DDR type zeolite is epitaxially grown on the MWW type zeolite using hydrothermal synthesis under a first condition; or
the MWW type zeolite is epitaxially grown on the DDR type zeolite using hydrothermal synthesis under a second condition.

6. The membrane of claim 5, wherein the DDR type zeolite is disposed on the MWW type zeolite, and the MWW type zeolite is composed of a group of a plurality of MWW type zeolite particles, wherein each of the MWW type zeolite particles has an average vertical dimension in a range of 10 nm to 1 μm; or
the MWW type zeolite is disposed on the DDR type zeolite, and the DDR type zeolite is composed of a plurality of DDR type zeolite particles, wherein each of the DDR type zeolite particles has an average vertical dimension in a range of 0.1 μm to 10 μm.

7. The membrane of claim 6, wherein under each of the first and second conditions, the hydrothermal synthesis is carried out for 0.5 to 15 days at a temperature of 100° C. to 200° C.

8. The membrane of claim 1, wherein the gas separation membrane separates carbon dioxide gas ($CO_2$) from gas mixture.

9. A method for preparing a gas separation membrane, the method comprising:
a first zeolite formation step of forming first zeolite, wherein the first zeolite formation step includes:
providing a first zeolite precursor solution contains a first structure directing agent and a first raw material;
performing first hydrothermal synthesis on the first zeolite precursor solution to form first zeolite in a form of a plurality of first zeolite particles; and
depositing the plurality of first zeolite particles on a support;
a second zeolite formation step of forming second zeolite, wherein the second zeolite formation step includes:
providing a second zeolite precursor solution, wherein the second zeolite precursor solution contains a second structure directing agent and a second raw material;
applying the second zeolite precursor solution on the plurality of first zeolite particles; and
performing second hydrothermal synthesis on the second zeolite precursor solution to form the second zeolite on the plurality of first zeolite particles,
wherein each of the first and second raw materials includes at least one of Si or Al,
wherein the second zeolite is epitaxially grown on the first zeolite,
wherein the particle of the first zeolite has an average vertical dimension in a range of 10 nm to 1 μm,
wherein a ratio of molar concentrations of Si, Al, the first structure directing agent, and a solvent in the first zeolite precursor solution is in a range of 100:0 to 10:10 to 500:500 to 20000, and
wherein a ratio of molar concentrations of Si, Al, the second structure directing agent, and a solvent in the second zeolite precursor solution is in a range of 100:0 to 10:1 to 200:500 to 20000.

10. The method of claim 9, wherein each of the first and second structure directing agents individually includes at least one selected from a group consisting of hexamethyleneimine (HMI), piperidine, 1-adamantylamine, ethylenediamine, methyltropinium salt, 1-TMAdaOH (N,N,N-trimethyl-1-adamantylammonium hydroxide), TMAdaBr (N,N,N-trimethyl-1-adamantylammonium bromide), TMAdaF (N,N,N-trimethyl-1-adamantylammonium fluoride), TMAdaCl (N,N,N-trimethyl-1-adamantylammonium chloride), TMAdaI (N,N,N-trimethyl-1-adamantylammonium iodide), TEAOH (tetraethylammonium hydroxide), TEABr (tetraethylammonium bromide), TEAF (tetraethylammonium fluoride), TEACl (tetraethylammonium chloride), TEAI (tetraethylammonium iodide), dipropylamine, and cyclohexylamine.

11. The method of claim 9, wherein the support includes at least one selected from a group consisting of α-alumina, γ-alumina, polypropylene, polyethylene, polytetrafluoroethylene, polysulfone, polyimide, silica, glass, mullite, zirconia, titania, yttria, ceria, vanadia, silicon, stainless steel, carbon, calcium oxide, and phosphorus oxide.

12. The method of claim 9, wherein the method further comprises, between the first zeolite formation step and the second zeolite formation step, a buffer formation step of forming a buffer, wherein the buffer covers at least a portion of each of the plurality of first zeolite particles,
wherein the buffer formation step includes:
providing a buffer precursor solution containing 1-adamantylamine, ethylenediamine, fumed silica, and a solvent, wherein a ratio of molar concentrations of 1-adamantylamine, ethylenediamine, fumed silica, and the solvent in the buffer precursor solution is in a range of 1 to 20:100 to 200:100:1000 to 20000;
applying the buffer precursor solution on the first zeolite; and
performing third hydrothermal synthesis on the buffer precursor solution to form the buffer on the first zeolite.

13. The method of claim 12, wherein the first and second zeolites have different zeolite structures,
wherein a zeolite structure of the buffer is the same as a zeolite structure of the second zeolite.

14. The method of claim 9, wherein each of the first zeolite formation step and the second zeolite formation step individually includes, after each of the first and second hydrothermal synthesis, calcining each of the first and second zeolites by heating each of the first and second zeolites at a temperature of 450 to 550° C. at a temperature ramp rate of 0.2 to 0.5° C./min for 12 to 40 hours.

15. The method of claim 9, wherein the method further comprises, after the second zeolite formation step, performing rapid thermal treating on the first and second zeolites for 10 seconds to 5 minutes at a temperature of 700 to 1200° C.

16. A method for preparing a gas separation membrane, the method comprising:
a first zeolite formation step of forming first zeolite, wherein the first zeolite formation step includes:
providing a first zeolite precursor solution contains a first structure directing agent and a first raw material;
performing first hydrothermal synthesis on the first zeolite precursor solution to form first zeolite in a form of a plurality of first zeolite particles; and
depositing the plurality of first zeolite particles on a support;
a second zeolite formation step of forming second zeolite, wherein the second zeolite formation step includes:
providing a second zeolite precursor solution, wherein the second zeolite precursor solution contains a second structure directing agent and a second raw material;

applying the second zeolite precursor solution on the plurality of first zeolite particles; and performing second hydrothermal synthesis on the second zeolite precursor solution to form the second zeolite on the plurality of first zeolite particles, wherein each of the first and second raw materials includes at least one of Si or Al, wherein the second zeolite is epitaxially grown on the first zeolite, wherein the particle of the first zeolite has an average vertical dimension in a range of 0.1 μm to 10 μm, wherein a ratio of molar concentrations of Si, Al, the first structure directing agent, and a solvent in the first zeolite precursor solution is in a range of 100:0 to 10:1 to 200:500 to 20000, and wherein a ratio of molar concentrations of Si, Al, the second structure directing agent, and a solvent in the second zeolite precursor solution is in a range of 100:0 to 10:1 to 200:500 to 20000.

* * * * *